(12) United States Patent
Guttmann

(10) Patent No.: US 10,579,877 B2
(45) Date of Patent: Mar. 3, 2020

(54) SYSTEM AND METHOD FOR SELECTIVE IMAGE PROCESSING BASED ON TYPE OF DETECTED OBJECT

(71) Applicant: Moshe Guttmann, Tel Aviv (IL)

(72) Inventor: Moshe Guttmann, Tel Aviv (IL)

(73) Assignee: Allegro Artificial Intelligence LTD, Tel Aviv (IL)

( * ) Notice: Subject to any disclaimer, the term of this patent is extended or adjusted under 35 U.S.C. 154(b) by 243 days.

(21) Appl. No.: 15/864,006

(22) Filed: Jan. 8, 2018

(65) Prior Publication Data

US 2018/0150694 A1 May 31, 2018

Related U.S. Application Data

(60) Provisional application No. 62/444,001, filed on Jan. 9, 2017, provisional application No. 62/452,707, filed on Jan. 31, 2017.

(51) Int. Cl.
*G06K 9/00* (2006.01)
*G06T 7/20* (2017.01)
*G06N 5/04* (2006.01)
*G06N 20/00* (2019.01)

(52) U.S. Cl.
CPC ..... *G06K 9/00677* (2013.01); *G06K 9/00335* (2013.01); *G06K 9/00718* (2013.01); *G06N 5/04* (2013.01); *G06T 7/20* (2013.01); *G06K 2009/00738* (2013.01); *G06N 20/00* (2019.01); *G06T 2207/20092* (2013.01)

(58) Field of Classification Search
None
See application file for complete search history.

(56) References Cited

U.S. PATENT DOCUMENTS

| | | | | |
|---|---|---|---|---|
| 2009/0262987 A1* | 10/2009 | Ioffe | ................ | G06K 9/00281 382/118 |
| 2012/0026381 A1* | 2/2012 | Lee | .................. | H04N 5/23212 348/333.12 |
| 2014/0270361 A1* | 9/2014 | Amma | .................. | G06T 7/75 382/103 |
| 2015/0208021 A1* | 7/2015 | Cho | .................. | G06K 9/00718 386/230 |
| 2015/0356374 A1* | 12/2015 | Mase | .................. | G06K 9/4671 382/195 |

* cited by examiner

*Primary Examiner* — Fayyaz Alam

(57) ABSTRACT

System and method for image processing are provided. Images may be obtained, for example by capturing the images using an image sensor. The images may be analyzed to identify objects. Based on the identified objects, regions in current images and/or in images captured in the future may be identified. Processing schemes for the identified regions may be selected, for example based on the identified objects. The regions may be processed according to the selected processing schemes.

20 Claims, 17 Drawing Sheets

1000

1010

1020

1030

SYSTEM AND METHOD FOR SELECTIVE IMAGE PROCESSING BASED ON TYPE OF DETECTED OBJECT

CROSS REFERENCES TO RELATED APPLICATIONS

This application claims the benefit of priority of U.S. Provisional Patent Application No. 62/444,001, filed on Jan. 9, 2017, which is incorporated herein by reference in its entirety. This application claims the benefit of priority of U.S. Provisional Patent Application No. 62/452,707, filed on Jan. 31, 2017, which is incorporated herein by reference in its entirety.

BACKGROUND

Technological Field

The disclosed embodiments generally relate to systems and methods for image processing. More particularly, the disclosed embodiments relate to systems and methods for selective image processing based on type of detected objects.

Background Information

Image sensors are now part of numerous devices, from security systems to mobile phones, and the availability of images and videos produced by those devices is increasing.

SUMMARY

In some embodiments, systems and methods for image processing are provided.

In some embodiments, a first and a second group of images may be obtained, for example by capturing the images using an image sensor; the first group of images may be analyzed to identify objects in the environment; a first and a second regions of the second group of images may be identified based on the identified objects; a processing scheme may be selected based on the identified objects; the first region may be processed using the selected processing scheme, and the second region may be processed using a different processing scheme.

In some embodiments, a first and a second group of images may be obtained, for example by capturing the images using an image sensor; the first group of images may be analyzed to obtain scene information; an inference model may be selected based on the scene information; and the second group of images may be processed using the selected inference model.

In some embodiments, a stream of images may be obtained, for example by capturing images using an image sensor; points in time associated with an activity may be obtained; for each point in time, the stream of images may be analyzed to identify events related to the activity and preceding the point in time; and based on the identified events, an event detection rule configured to analyze images to detect at least one event may be obtained.

In some embodiments, image based information may be obtained; the image based information may be analyzed to identify instances of a repeated activity of a selected person; and properties of the repeated activity of the selected person may be determined based on the identified instances of the repeated activity.

DESCRIPTION

Figure 1A:
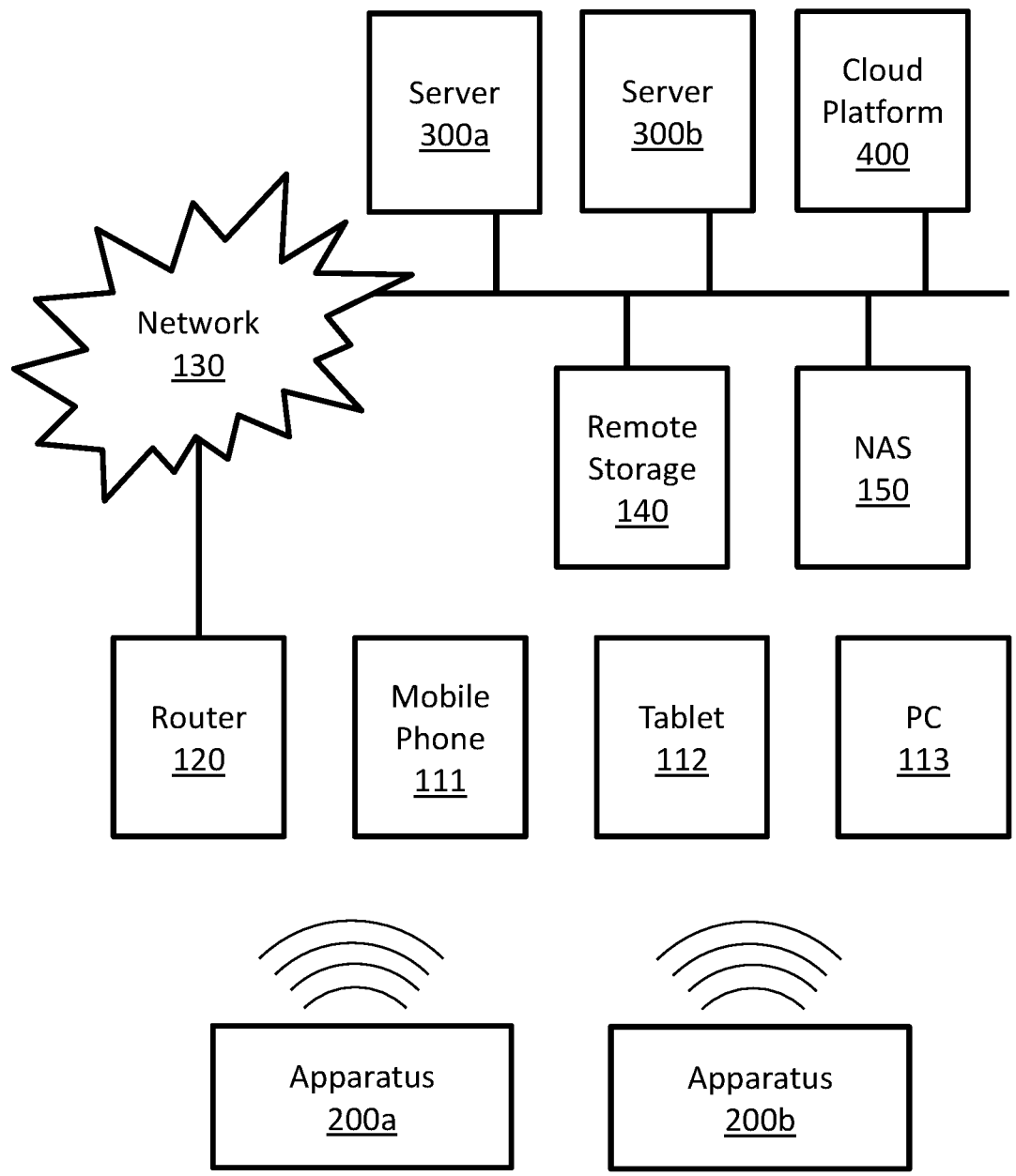
FIGS. 1A and 1B are block diagrams illustrating some possible implementations of a communicating system.

Unless specifically stated otherwise, as apparent from the following discussions, it is appreciated that throughout the specification discussions utilizing terms such as "processing", "calculating", "computing", "determining", "generating", "setting", "configuring", "selecting", "defining", "applying", "obtaining", "monitoring", "providing", "identifying", "segmenting", "classifying", "analyzing", "associating", "extracting", "storing", "receiving", "transmitting", or the like, include action and/or processes of a computer that manipulate and/or transform data into other data, said data represented as physical quantities, for example such as electronic quantities, and/or said data representing the physical objects. The terms "computer", "processor", "controller", "processing unit", "computing unit", and "processing module" should be expansively construed to cover any kind of electronic device, component or unit with data processing capabilities, including, by way of non-limiting example, a personal computer, a wearable computer, a tablet, a smartphone, a server, a computing system, a cloud computing platform, a communication device, a processor (for example, digital signal processor (DSP), an image signal processor (ISR), a microcontroller, a field programmable gate array (FPGA), an application specific integrated circuit (ASIC), a central processing unit (CPA), a graphics processing unit (GPU), a visual processing unit (VPU), and so on), possibly with embedded memory, a single core processor, a multi core processor, a core within a processor, any other electronic computing device, or any combination of the above.

The operations in accordance with the teachings herein may be performed by a computer specially constructed or programmed to perform the described functions.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) may be included in at least one embodiment of the presently disclosed subject matter. Thus the appearance of the phrase "one case", "some cases", "other cases" or variants thereof does not necessarily refer to the same embodiment(s). As used herein, the term "and/or" includes any and all combinations of one or more of the associated listed items.

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable subcombination.

The term "image sensor" is recognized by those skilled in the art and refers to any device configured to capture images, a sequence of images, videos, and so forth. This includes sensors that convert optical input into images, where optical input can be visible light (like in a camera), radio waves, microwaves, terahertz waves, ultraviolet light, infrared light, x-rays, gamma rays, and/or any other light spectrum. This also includes both 2D and 3D sensors. Examples of image sensor technologies may include: CCD, CMOS, NMOS, and so forth. 3D sensors may be implemented using different technologies, including: stereo camera, active stereo camera, time of flight camera, structured light camera, radar, range image camera, and so forth.

The term "audio sensor" is recognized by those skilled in the art and refers to any device configured to capture audio data. This includes sensors that convert audio and sounds into digital audio data.

The term "electrical impedance sensor" is recognized by those skilled in the art and refers to any sensor configured to measure the electrical connectivity and/or permittivity between two or more points. This include but not limited to: sensors configured to measuring changes in connectivity and/or permittivity over time; sensors configured to measure the connectivity and/or permittivity of biological tissues; sensors configured to measure the connectivity and/or permittivity of parts of body based, at least in part, on the connectivity and/or permittivity between surface electrodes; sensors configured to provide Electrical Impedance Tomography images, and so forth. Such sensors may include but not limited to: sensors that apply alternating currents at a single frequency; sensors that apply alternating currents at multiple frequencies; and so forth. Additionally, this may also include sensors that measure the electrical resistance between two or more points, which are sometimes referred to as ohmmeter.

In embodiments of the presently disclosed subject matter, one or more stages illustrated in the figures may be executed in a different order and/or one or more groups of stages may be executed simultaneously and vice versa. The figures illustrate a general schematic of the system architecture in accordance embodiments of the presently disclosed subject matter. Each module in the figures can be made up of any combination of software, hardware and/or firmware that performs the functions as defined and explained herein. The modules in the figures may be centralized in one location or dispersed over more than one location.

It should be noted that some examples of the presently disclosed subject matter are not limited in application to the details of construction and the arrangement of the components set forth in the following description or illustrated in the drawings. The invention can be capable of other embodiments or of being practiced or carried out in various ways. Also, it is to be understood that the phraseology and terminology employed herein is for the purpose of description and should not be regarded as limiting.

In this document, an element of a drawing that is not described within the scope of the drawing and is labeled with a numeral that has been described in a previous drawing may have the same use and description as in the previous drawings.

The drawings in this document may not be to any scale. Different figures may use different scales and different scales can be used even within the same drawing, for example different scales for different views of the same object or different scales for the two adjacent objects.

FIG. 1A is a block diagram illustrating a possible implementation of a communicating system. In this example, apparatuses 200a and 200b may communicate with server 300a, with server 300b, with cloud platform 400, with each other, and so forth. Possible implementations of apparatuses 200a and 200b may include apparatus 200 as described in FIGS. 2A and 2B. Possible implementations of servers 300a and 300b may include server 300 as described in FIG. 3. Some possible implementations of cloud platform 400 are described in FIGS. 4A, 4B and 5. In this example apparatuses 200a and 200b may communicate directly with mobile phone 111, tablet 112, and personal computer (PC) 113. Apparatuses 200a and 200b may communicate with local router 120 directly, and/or through at least one of mobile phone 111, tablet 112, and personal computer (PC) 113. In this example, local router 120 may be connected with a communication network 130. Examples of communication network 130 may include the Internet, phone networks, cellular networks, satellite communication networks, private communication networks, virtual private networks (VPN), and so forth. Apparatuses 200a and 200b may connect to communication network 130 through local router 120 and/or directly. Apparatuses 200a and 200b may communicate with other devices, such as servers 300a, server 300b, cloud platform 400, remote storage 140 and network attached storage (NAS) 150, through communication network 130 and/or directly.

Figure 1B:
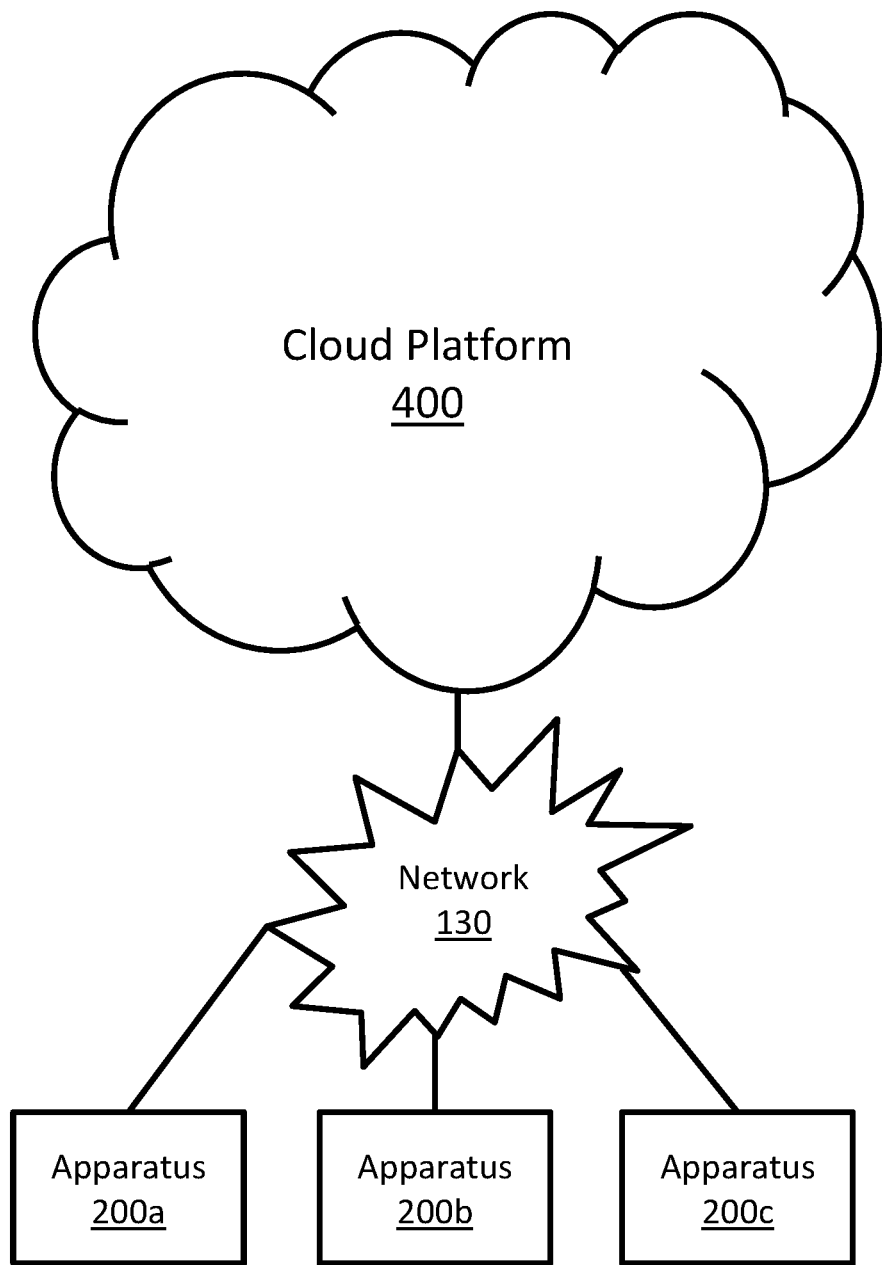

FIG. 1B is a block diagram illustrating a possible implementation of a communicating system. In this example, apparatuses 200a, 200b and 200c may communicate with cloud platform 400 and/or with each other through communication network 130. Possible implementations of apparatuses 200a, 200b and 200c may include apparatus 200 as described in FIGS. 2A and 2B. Some possible implementations of cloud platform 400 are described in FIGS. 4A, 4B and 5.

FIGS. 1A and 1B illustrate some possible implementations of a communication system. In some embodiments, other communication systems that enable communication between apparatus 200 and server 300 may be used. In some embodiments, other communication systems that enable communication between apparatus 200 and cloud platform 400 may be used. In some embodiments, other communication systems that enable communication among a plurality of apparatuses 200 may be used.

Figure 2A:
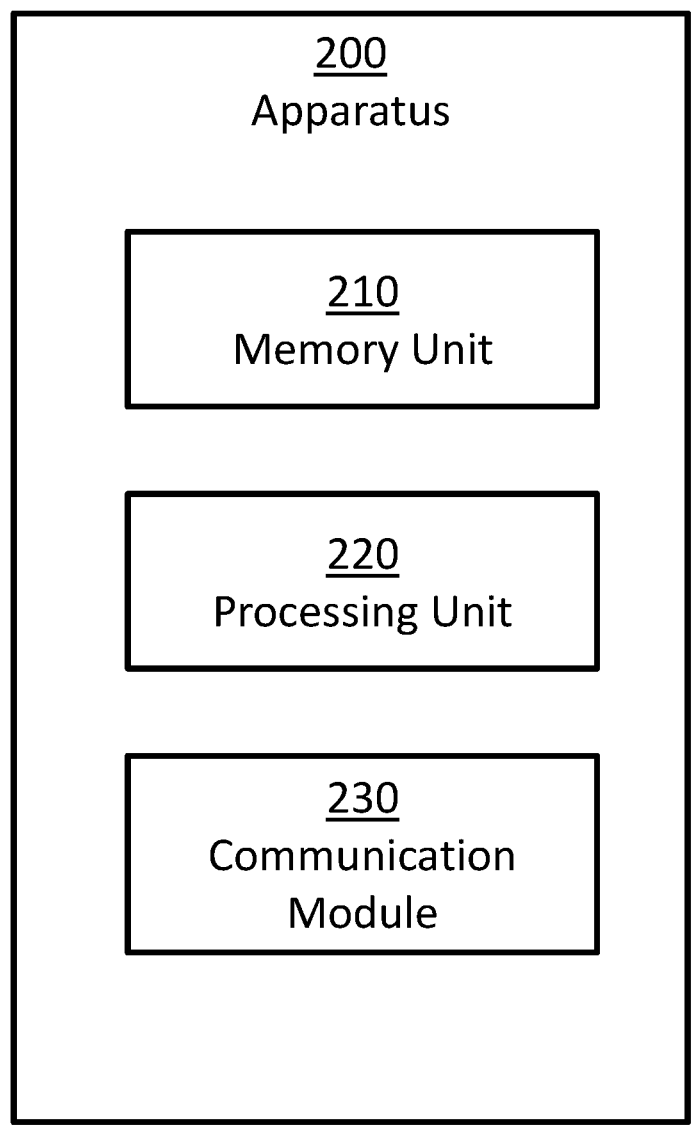
FIGS. 2A and 2B are block diagrams illustrating some possible implementations of an apparatus.

FIG. 2A is a block diagram illustrating a possible implementation of apparatus 200. In this example, apparatus 200 may comprise: one or more memory units 210, one or more processing units 220, and one or more communication modules 230. In some implementations, apparatus 200 may comprise additional components, while some components listed above may be excluded.

Figure 2B:
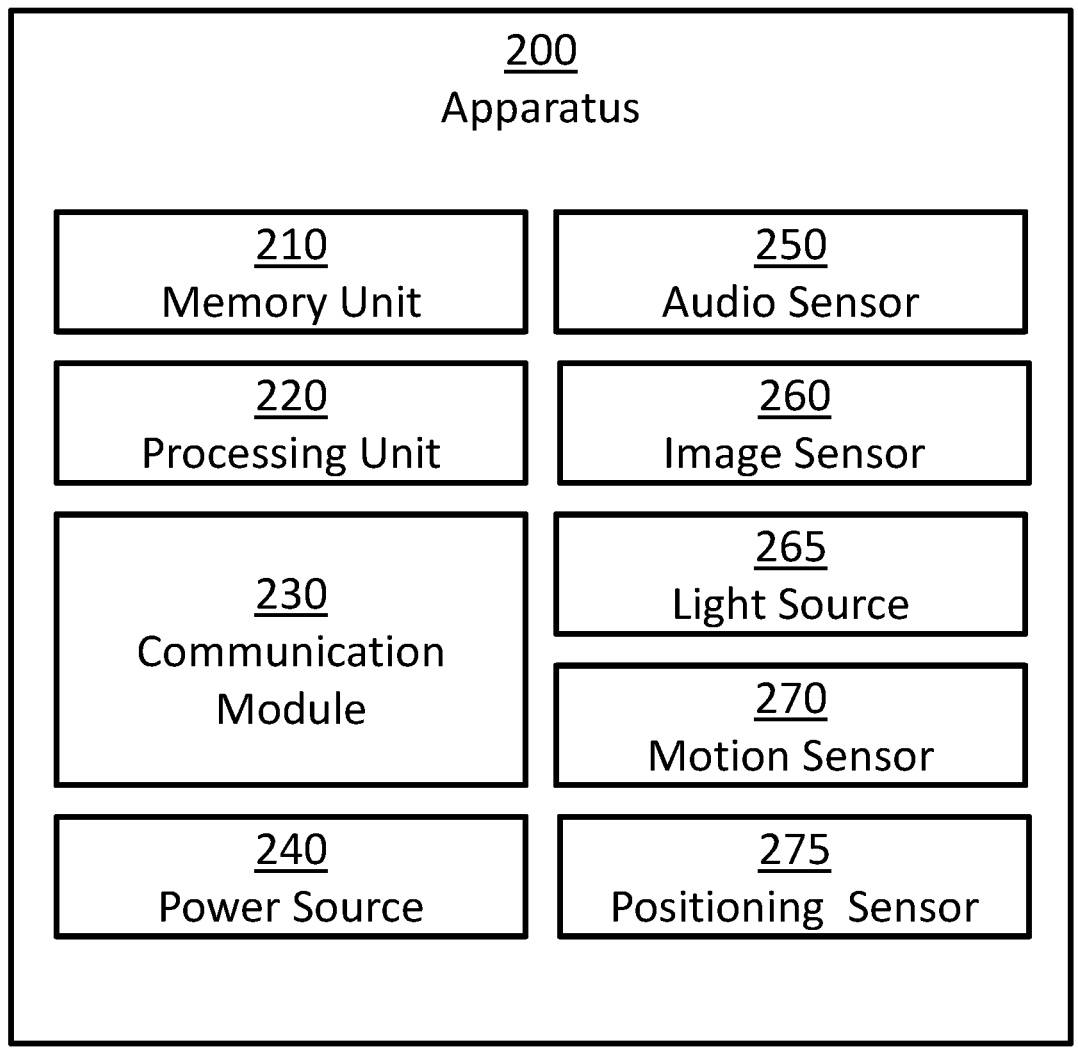

FIG. 2B is a block diagram illustrating a possible implementation of apparatus 200. In this example, apparatus 200 may comprise: one or more memory units 210, one or more processing units 220, one or more communication modules 230, one or more power sources 240, one or more audio sensors 250, one or more image sensors 260, one or more light sources 265, one or more motion sensors 270, and one or more positioning sensors 275. In some implementations, apparatus 200 may comprise additional components, while some components listed above may be excluded. For example, in some implementations apparatus 200 may also comprise at least one of the following: one or more barometers; one or more pressure sensors; one or more proximity sensors; one or more electrical impedance sensors; one or more electrical voltage sensors; one or more electrical current sensors; one or more user input devices; one or more output devices; and so forth. In another example, in some implementations at least one of the following may be excluded from apparatus 200: memory units 210, communication modules 230, power sources 240, audio sensors 250, image sensors 260, light sources 265, motion sensors 270, and positioning sensors 275.

In some embodiments, one or more power sources 240 may be configured to: power apparatus 200; power server 300; power cloud platform 400; and/or power computational node 500. Possible implementation examples of power sources 240 may include: one or more electric batteries; one or more capacitors; one or more connections to external power sources; one or more power convertors; any combination of the above; and so forth.

In some embodiments, the one or more processing units 220 may be configured to execute software programs. For example, processing units 220 may be configured to execute software programs stored on the memory units 210. In some cases, the executed software programs may store information in memory units 210. In some cases, the executed software programs may retrieve information from the memory units 210. Possible implementation examples of the processing units 220 may include: one or more single core processors, one or more multicore processors; one or more controllers; one or more application processors; one or more system on a chip processors; one or more central processing units; one or more graphical processing units; one or more neural processing units; any combination of the above; and so forth.

In some embodiments, the one or more communication modules 230 may be configured to receive and transmit information. For example, control signals may be transmitted and/or received through communication modules 230. In another example, information received though communication modules 230 may be stored in memory units 210. In an additional example, information retrieved from memory units 210 may be transmitted using communication modules 230. In another example, input data may be transmitted and/or received using communication modules 230. Examples of such input data may include: input data inputted by a user using user input devices; information captured using one or more sensors; and so forth. Examples of such sensors may include: audio sensors 250; image sensors 260; motion sensors 270; positioning sensors 275; chemical sensors; temperature sensors; barometers; pressure sensors; proximity sensors; electrical impedance sensors; electrical voltage sensors; electrical current sensors; and so forth.

In some embodiments, the one or more audio sensors 250 may be configured to capture audio by converting sounds to digital information. Some examples of audio sensors 250 may include: microphones, unidirectional microphones, bidirectional microphones, cardioid microphones, omnidirectional microphones, onboard microphones, wired microphones, wireless microphones, any combination of the above, and so forth. In some examples, the captured audio may be stored in memory units 210. In some additional examples, the captured audio may be transmitted using communication modules 230, for example to other computerized devices, such as server 300, cloud platform 400, computational node 500, and so forth. In some examples, processing units 220 may control the above processes. For example, processing units 220 may control at least one of: capturing of the audio; storing the captured audio; transmitting of the captured audio; and so forth. In some cases, the captured audio may be processed by processing units 220. For example, the captured audio may be compressed by processing units 220; possibly followed: by storing the compressed captured audio in memory units 210; by transmitted the compressed captured audio using communication modules 230; and so forth. In another example, the captured audio may be processed using speech recognition algorithms. In another example, the captured audio may be processed using speaker recognition algorithms.

In some embodiments, the one or more image sensors 260 may be configured to capture visual information by converting light to: images; sequence of images; videos; and so forth. In some examples, the captured visual information may be stored in memory units 210. In some additional examples, the captured visual information may be transmitted using communication modules 230, for example to other computerized devices, such as server 300, cloud platform 400, computational node 500, and so forth. In some examples, processing units 220 may control the above processes. For example, processing units 220 may control at least one of: capturing of the visual information; storing the captured visual information; transmitting of the captured visual information; and so forth. In some cases, the captured visual information may be processed by processing units 220. For example, the captured visual information may be compressed by processing units 220; possibly followed: by storing the compressed captured visual information in memory units 210; by transmitted the compressed captured visual information using communication modules 230; and so forth. In another example, the captured visual information may be processed in order to: detect objects, detect events, detect action, detect face, detect people, recognize person, and so forth.

In some embodiments, the one or more light sources 265 may be configured to emit light, for example in order to enable better image capturing by image sensors 260. In some examples, the emission of light may be coordinated with the capturing operation of image sensors 260. In some examples, the emission of light may be continuous. In some examples, the emission of light may be performed at selected times. The emitted light may be visible light, infrared light, x-rays, gamma rays, and/or in any other light spectrum.

In some embodiments, the one or more motion sensors 270 may be configured to perform at least one of the following: detect motion of objects in the environment of apparatus 200; measure the velocity of objects in the environment of apparatus 200; measure the acceleration of objects in the environment of apparatus 200; detect motion of apparatus 200; measure the velocity of apparatus 200; measure the acceleration of apparatus 200; and so forth. In some implementations, the one or more motion sensors 270 may comprise one or more accelerometers configured to detect changes in proper acceleration and/or to measure proper acceleration of apparatus 200. In some implementations, the one or more motion sensors 270 may comprise one or more gyroscopes configured to detect changes in the orientation of apparatus 200 and/or to measure information related to the orientation of apparatus 200. In some implementations, motion sensors 270 may be implemented using image sensors 260, for example by analyzing images captured by image sensors 260 to perform at least one of the following tasks: track objects in the environment of apparatus 200; detect moving objects in the environment of apparatus 200; measure the velocity of objects in the environment of apparatus 200; measure the acceleration of objects in the environment of apparatus 200; measure the velocity of apparatus 200, for example by calculating the egomotion of image sensors 260; measure the acceleration of apparatus 200, for example by calculating the egomotion of image sensors 260; and so forth. In some implementations, motion sensors 270 may be implemented using image sensors 260 and light sources 265, for example by implementing a LIDAR using image sensors 260 and light sources 265. In some implementations, motion sensors 270 may be implemented using one or more RADARs. In some examples, information captured using motion sensors 270 may be stored in memory units 210, may be processed by processing units 220, may be transmitted and/or received using communication modules 230, and so forth.

In some embodiments, the one or more positioning sensors 275 may be configured to obtain positioning information of apparatus 200, to detect changes in the position of apparatus 200, and/or to measure the position of apparatus 200. In some examples, positioning sensors 275 may be implemented using one of the following technologies: Global Positioning System (GPS), GLObal NAvigation Satellite System (GLONASS), Galileo global navigation system, BeiDou navigation system, other Global Navigation Satellite Systems (GNSS), Indian Regional Navigation Satellite System (IRNSS), Local Positioning Systems (LPS), Real-Time Location Systems (RTLS), Indoor Positioning System (IPS), Wi-Fi based positioning systems, cellular triangulation, and so forth. In some examples, information captured using positioning sensors 275 may be stored in memory units 210, may be processed by processing units 220, may be transmitted and/or received using communication modules 230, and so forth.

In some embodiments, the one or more chemical sensors may be configured to perform at least one of the following: measure chemical properties in the environment of apparatus 200; measure changes in the chemical properties in the environment of apparatus 200; detect the present of chemicals in the environment of apparatus 200; measure the concentration of chemicals in the environment of apparatus 200. Examples of such chemical properties may include: pH level, toxicity, temperature, and so forth. Examples of such chemicals may include: electrolytes, particular enzymes, particular hormones, particular proteins, smoke, carbon dioxide, carbon monoxide, oxygen, ozone, hydrogen, hydrogen sulfide, and so forth. In some examples, information captured using chemical sensors may be stored in memory units 210, may be processed by processing units 220, may be transmitted and/or received using communication modules 230, and so forth.

In some embodiments, the one or more temperature sensors may be configured to detect changes in the temperature of the environment of apparatus 200 and/or to measure the temperature of the environment of apparatus 200. In some examples, information captured using temperature sensors may be stored in memory units 210, may be processed by processing units 220, may be transmitted and/or received using communication modules 230, and so forth.

In some embodiments, the one or more barometers may be configured to detect changes in the atmospheric pressure in the environment of apparatus 200 and/or to measure the atmospheric pressure in the environment of apparatus 200. In some examples, information captured using the barometers may be stored in memory units 210, may be processed by processing units 220, may be transmitted and/or received using communication modules 230, and so forth.

In some embodiments, the one or more pressure sensors may be configured to perform at least one of the following: detect pressure in the environment of apparatus 200; measure pressure in the environment of apparatus 200; detect change in the pressure in the environment of apparatus 200; measure change in pressure in the environment of apparatus 200; detect pressure at a specific point and/or region of the surface area of apparatus 200; measure pressure at a specific point and/or region of the surface area of apparatus 200; detect change in pressure at a specific point and/or area; measure change in pressure at a specific point and/or region of the surface area of apparatus 200; measure the pressure differences between two specific points and/or regions of the surface area of apparatus 200; measure changes in relative pressure between two specific points and/or regions of the surface area of apparatus 200. In some examples, information captured using the pressure sensors may be stored in memory units 210, may be processed by processing units 220, may be transmitted and/or received using communication modules 230, and so forth.

In some embodiments, the one or more proximity sensors may be configured to perform at least one of the following: detect contact of a solid object with the surface of apparatus 200; detect contact of a solid object with a specific point and/or region of the surface area of apparatus 200; detect a proximity of apparatus 200 to an object. In some implementations, proximity sensors may be implemented using image sensors 260 and light sources 265, for example by emitting light using light sources 265, such as ultraviolet light, visible light, infrared light and/or microwave light, and detecting the light reflected from nearby objects using image sensors 260 to detect the present of nearby objects. In some examples, information captured using the proximity sensors may be stored in memory units 210, may be processed by processing units 220, may be transmitted and/or received using communication modules 230, and so forth.

In some embodiments, the one or more electrical impedance sensors may be configured to perform at least one of the following: detect change over time in the connectivity and/or permittivity between two electrodes; measure changes over time in the connectivity and/or permittivity between two electrodes; capture Electrical Impedance Tomography (EIT) images. In some examples, information captured using the electrical impedance sensors may be stored in memory units 210, may be processed by processing units 220, may be transmitted and/or received using communication modules 230, and so forth.

In some embodiments, the one or more electrical voltage sensors may be configured to perform at least one of the following: detect and/or measure voltage between two electrodes; detect and/or measure changes over time in the voltage between two electrodes. In some examples, information captured using the electrical voltage sensors may be stored in memory units 210, may be processed by processing units 220, may be transmitted and/or received using communication modules 230, and so forth.

In some embodiments, the one or more electrical current sensors may be configured to perform at least one of the following: detect and/or measure electrical current flowing between two electrodes; detect and/or measure changes over time in the electrical current flowing between two electrodes. In some examples, information captured using the electrical current sensors may be stored in memory units 210, may be processed by processing units 220, may be transmitted and/or received using communication modules 230, and so forth.

In some embodiments, the one or more user input devices may be configured to allow one or more users to input information. In some examples, user input devices may comprise at least one of the following: a keyboard, a mouse, a touch pad, a touch screen, a joystick, a microphone, an image sensor, and so forth. In some examples, the user input may be in the form of at least one of: text, sounds, speech, hand gestures, body gestures, tactile information, and so forth. In some examples, the user input may be stored in memory units 210, may be processed by processing units 220, may be transmitted and/or received using communication modules 230, and so forth.

In some embodiments, the one or more user output devices may be configured to provide output information to one or more users. In some examples, such output information may comprise of at least one of: notifications, feedbacks, reports, and so forth. In some examples, user output devices may comprise at least one of: one or more audio output devices; one or more textual output devices; one or more visual output devices; one or more tactile output devices; and so forth. In some examples, the one or more audio output devices may be configured to output audio to a user, for example through: a headset, a set of speakers, and so forth. In some examples, the one or more visual output devices may be configured to output visual information to a user, for example through: a display screen, an augmented reality display system, a printer, a LED indicator, and so forth. In some examples, the one or more tactile output devices may be configured to output tactile feedbacks to a user, for example through vibrations, through motions, by applying forces, and so forth. In some examples, the output may be provided: in real time, offline, automatically, upon request, and so forth. In some examples, the output information may be read from memory units 210, may be provided by a software executed by processing units 220, may be transmitted and/or received using communication modules 230, and so forth.

Figure 3:
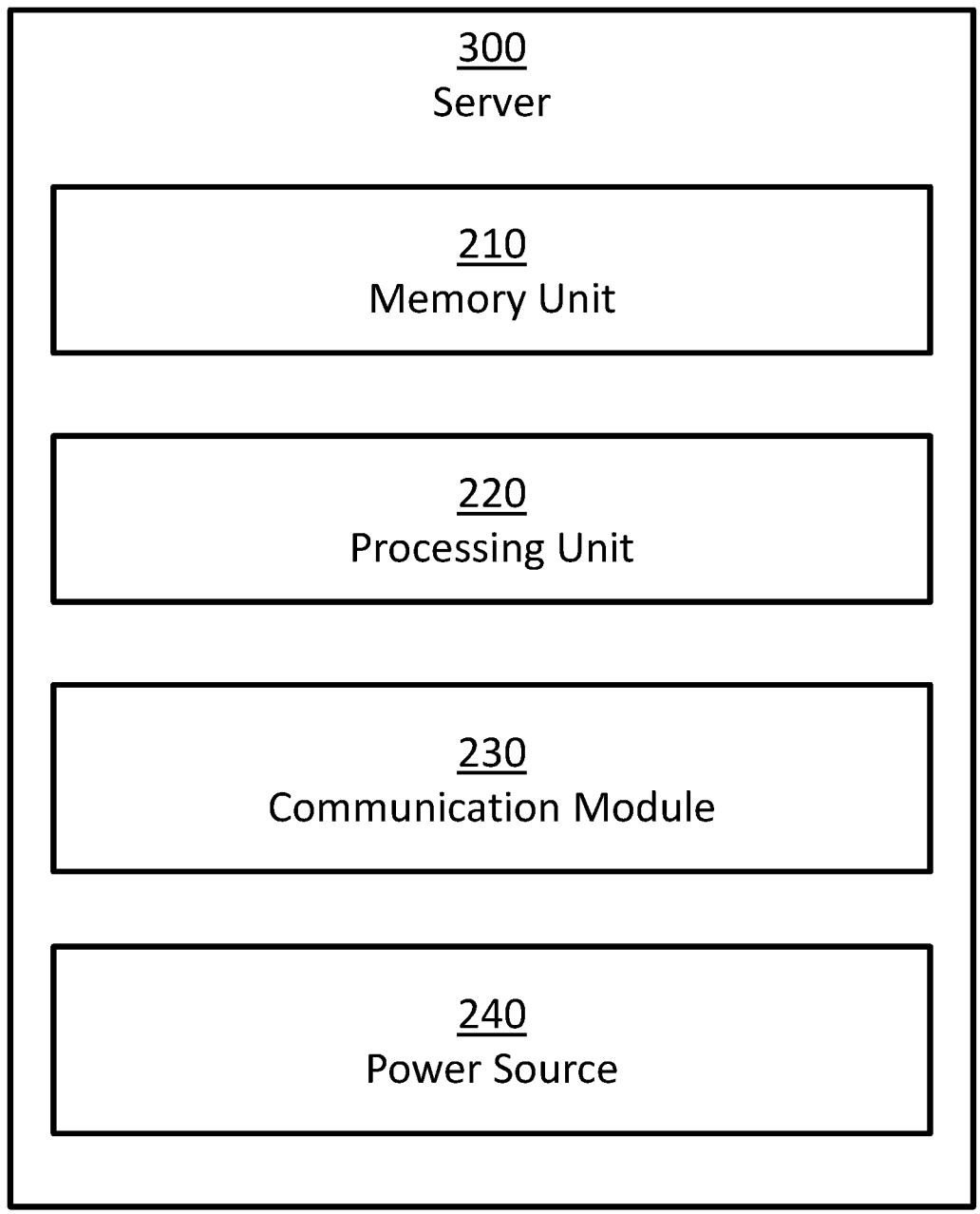
FIG. 3 is a block diagram illustrating a possible implementation of a server.

FIG. 3 is a block diagram illustrating a possible implementation of server 300. In this example, server 300 may comprise: one or more memory units 210, one or more processing units 220, one or more communication modules 230, and one or more power sources 240. In some implementations, server 300 may comprise additional components, while some components listed above may be excluded. For example, in some implementations server 300 may also comprise at least one of the following: one or more user input devices; one or more output devices; and so forth. In another example, in some implementations at least one of the following may be excluded from server 300: memory units 210, communication modules 230, and power sources 240.

Figure 4A:
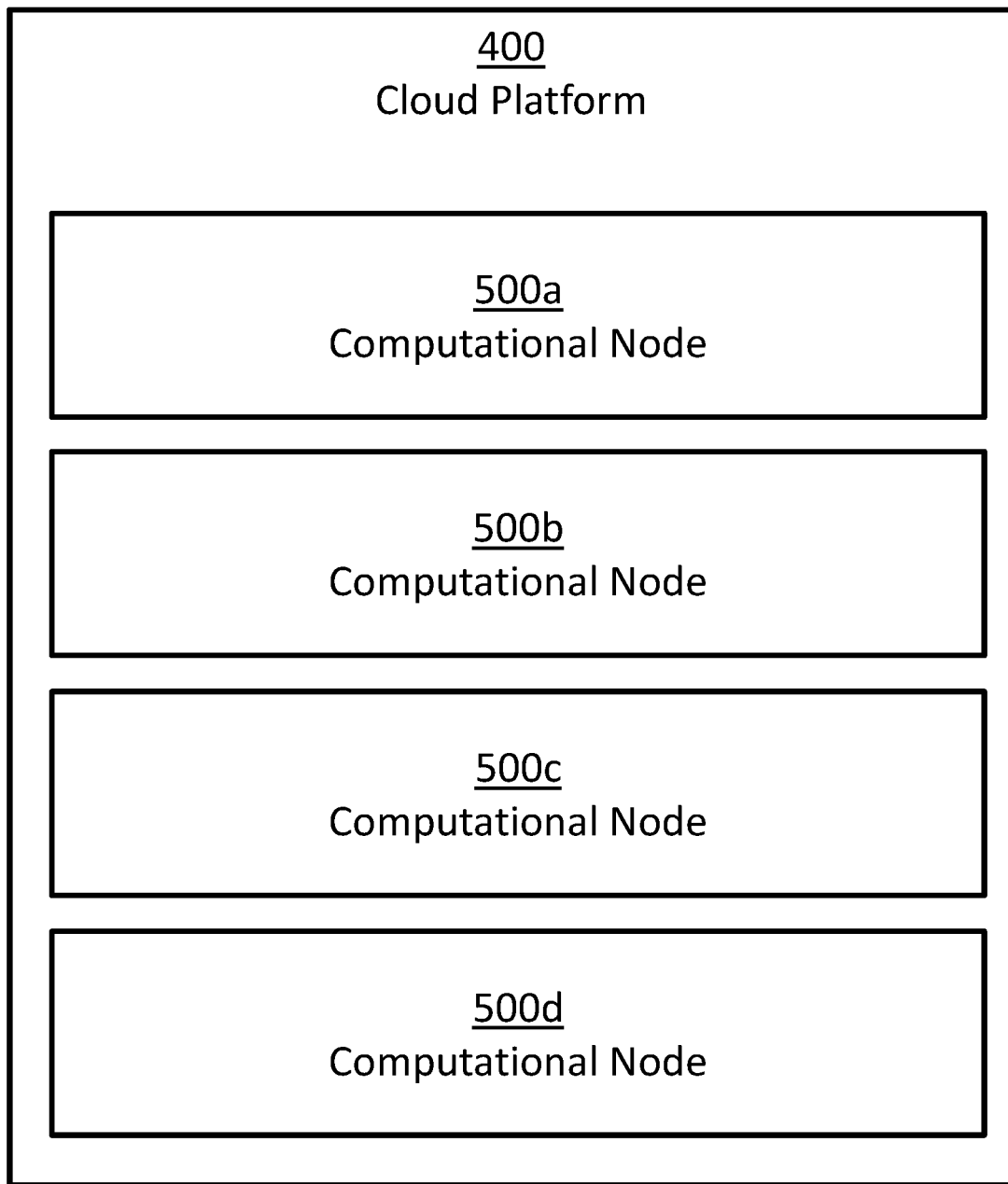
FIGS. 4A and 4B are block diagrams illustrating some possible implementations of a cloud platform.

FIG. 4A is a block diagram illustrating a possible implementation of cloud platform 400. In this example, cloud platform 400 may comprise computational node 500a, computational node 500b, computational node 500c and computational node 500d. In some examples, a possible implementation of computational nodes 500a, 500b, 500c and 500d may comprise server 300 as described in FIG. 3. In some examples, a possible implementation of computational nodes 500a, 500b, 500c and 500d may comprise computational node 500 as described in FIG. 5.

Figure 4B:
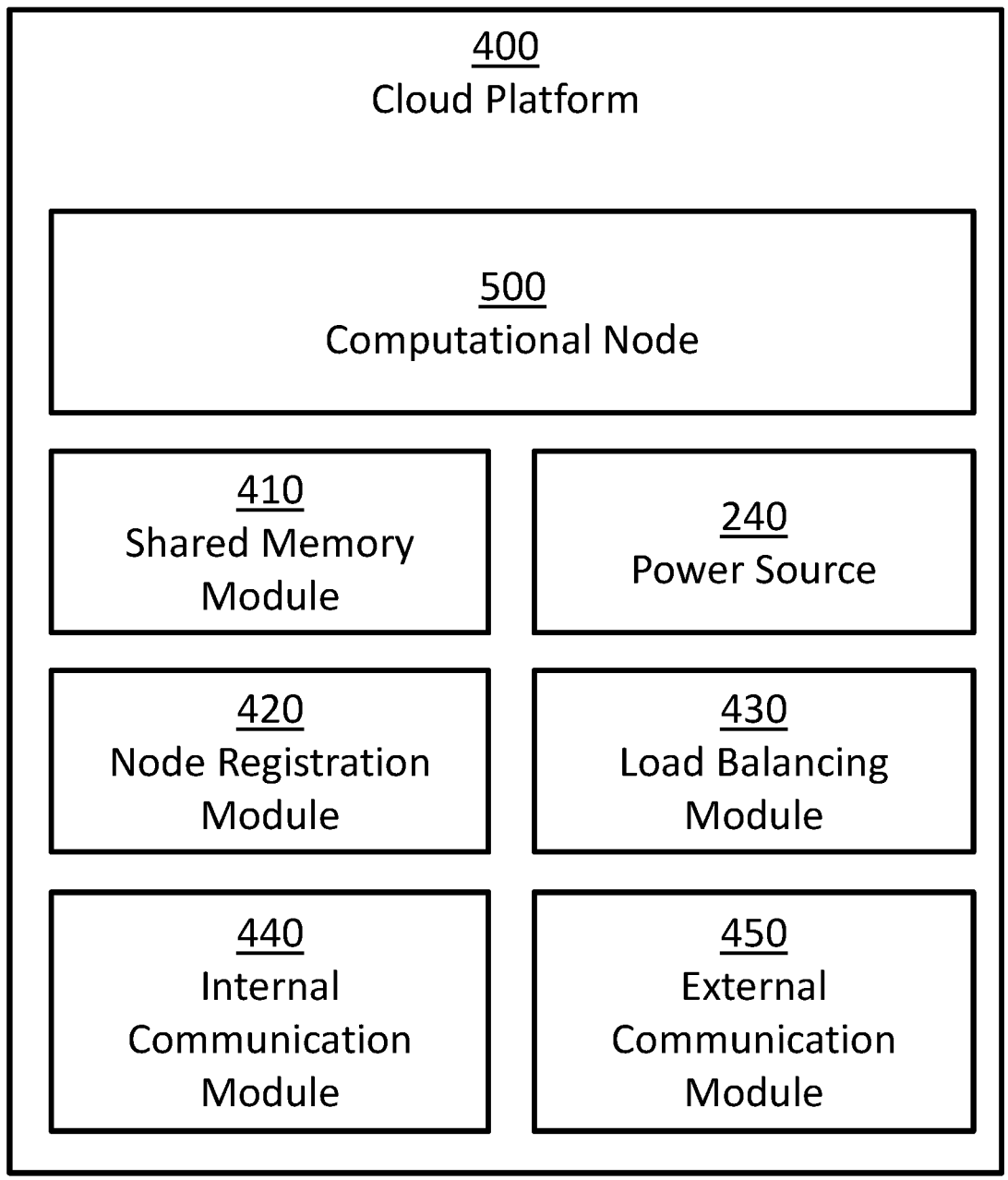

FIG. 4B is a block diagram illustrating a possible implementation of cloud platform 400. In this example, cloud platform 400 may comprise: one or more computational nodes 500, one or more shared memory modules 410, one or more power sources 240, one or more node registration modules 420, one or more load balancing modules 430, one or more internal communication modules 440, and one or more external communication modules 450. In some implementations, cloud platform 400 may comprise additional components, while some components listed above may be excluded. For example, in some implementations cloud platform 400 may also comprise at least one of the following: one or more user input devices; one or more output devices; and so forth. In another example, in some implementations at least one of the following may be excluded from cloud platform 400: shared memory modules 410, power sources 240, node registration modules 420, load balancing modules 430, internal communication modules 440, and external communication modules 450.

Figure 5:
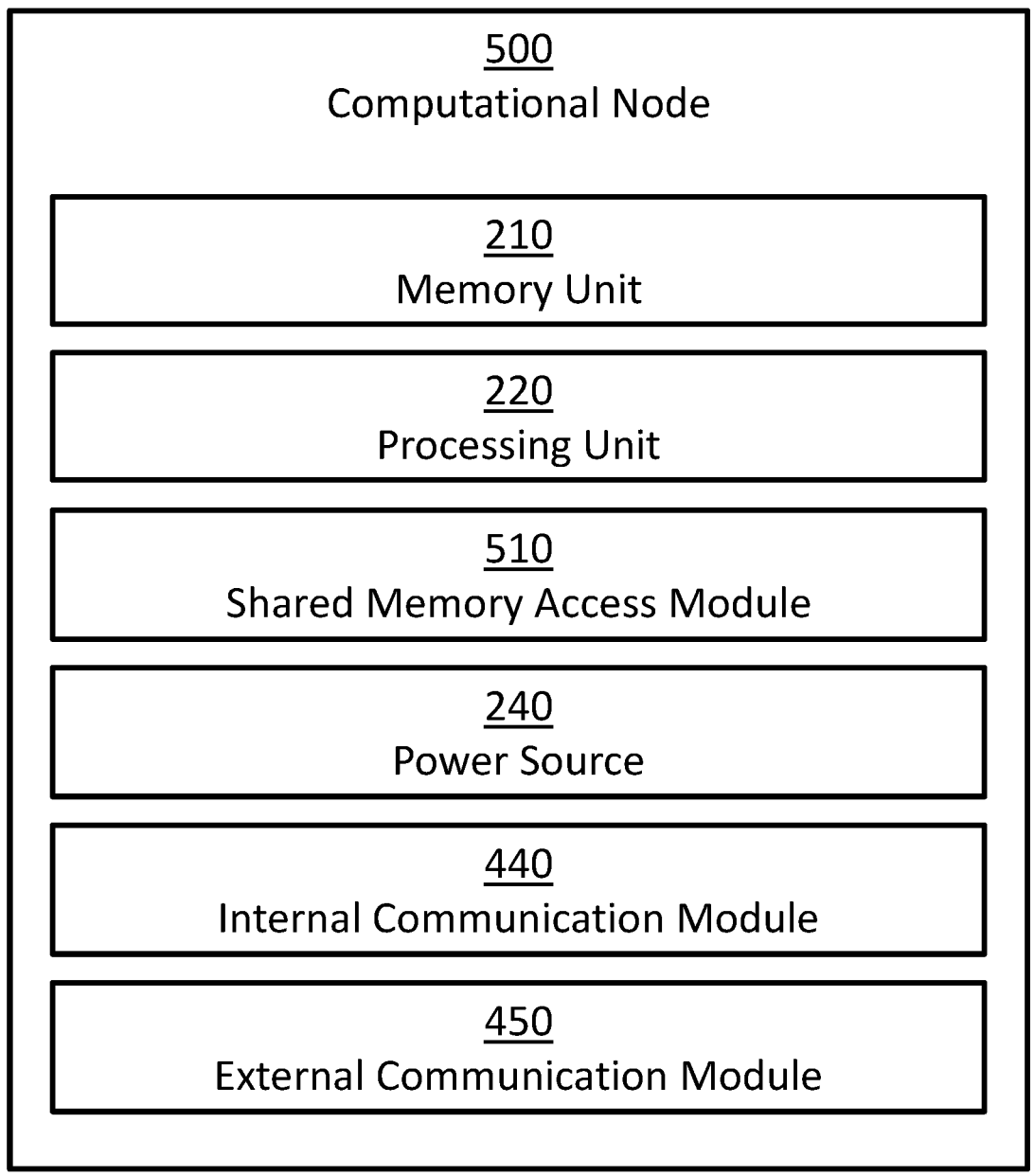
FIG. 5 is a block diagram illustrating a possible implementation of a computational node.

FIG. 5 is a block diagram illustrating a possible implementation of computational node 500. In this example, computational node 500 may comprise: one or more memory units 210, one or more processing units 220, one or more shared memory access modules 510, one or more power sources 240, one or more internal communication modules 440, and one or more external communication modules 450. In some implementations, computational node 500 may comprise additional components, while some components listed above may be excluded. For example, in some implementations computational node 500 may also comprise at least one of the following: one or more user input devices; one or more output devices; and so forth. In another example, in some implementations at least one of the following may be excluded from computational node 500: memory units 210, shared memory access modules 510, power sources 240, internal communication modules 440, and external communication modules 450.

In some embodiments, internal communication modules 440 and external communication modules 450 may be implemented as a combined communication module, such as communication modules 230. In some embodiments, one possible implementation of cloud platform 400 may comprise server 300. In some embodiments, one possible implementation of computational node 500 may comprise server 300. In some embodiments, one possible implementation of shared memory access modules 510 may comprise using internal communication modules 440 to send information to shared memory modules 410 and/or receive information from shared memory modules 410. In some embodiments, node registration modules 420 and load balancing modules 430 may be implemented as a combined module.

In some embodiments, the one or more shared memory modules 410 may be accessed by more than one computational node. Therefore, shared memory modules 410 may allow information sharing among two or more computational nodes 500. In some embodiments, the one or more shared memory access modules 510 may be configured to enable access of computational nodes 500 and/or the one or more processing units 220 of computational nodes 500 to shared memory modules 410. In some examples, computational nodes 500 and/or the one or more processing units 220 of computational nodes 500, may access shared memory modules 410, for example using shared memory access modules 510, in order to perform at least one of: executing software programs stored on shared memory modules 410, store information in shared memory modules 410, retrieve information from the shared memory modules 410.

In some embodiments, the one or more node registration modules 420 may be configured to track the availability of the computational nodes 500. In some examples, node registration modules 420 may be implemented as: a software program, such as a software program executed by one or more of the computational nodes 500; a hardware solution; a combined software and hardware solution; and so forth. In some implementations, node registration modules 420 may communicate with computational nodes 500, for example using internal communication modules 440. In some examples, computational nodes 500 may notify node registration modules 420 of their status, for example by sending messages: at computational node 500 startup; at computational node 500 shutdown; at constant intervals; at selected times; in response to queries received from node registration modules 420; and so forth. In some examples, node registration modules 420 may query about computational nodes 500 status, for example by sending messages: at node registration module 420 startup; at constant intervals; at selected times; and so forth.

In some embodiments, the one or more load balancing modules 430 may be configured to divide the work load among computational nodes 500. In some examples, load balancing modules 430 may be implemented as: a software program, such as a software program executed by one or more of the computational nodes 500; a hardware solution; a combined software and hardware solution; and so forth. In some implementations, load balancing modules 430 may interact with node registration modules 420 in order to obtain information regarding the availability of the computational nodes 500. In some implementations, load balancing modules 430 may communicate with computational nodes 500, for example using internal communication modules 440. In some examples, computational nodes 500 may notify load balancing modules 430 of their status, for example by sending messages: at computational node 500 startup; at computational node 500 shutdown; at constant intervals; at selected times; in response to queries received from load balancing modules 430; and so forth. In some examples, load balancing modules 430 may query about computational nodes 500 status, for example by sending messages: at load balancing module 430 startup; at constant intervals; at selected times; and so forth.

In some embodiments, the one or more internal communication modules 440 may be configured to receive information from one or more components of cloud platform 400, and/or to transmit information to one or more components of cloud platform 400. For example, control signals and/or synchronization signals may be sent and/or received through internal communication modules 440. In another example, input information for computer programs, output information of computer programs, and/or intermediate information of computer programs, may be sent and/or received through internal communication modules 440. In another example, information received though internal communication modules 440 may be stored in memory units 210, in shared memory units 410, and so forth. In an additional example, information retrieved from memory units 210 and/or shared memory units 410 may be transmitted using internal communication modules 440. In another example, input data may be transmitted and/or received using internal communication modules 440. Examples of such input data may include input data inputted by a user using user input devices.

In some embodiments, the one or more external communication modules 450 may be configured to receive and/or to transmit information. For example, control signals may be sent and/or received through external communication modules 450. In another example, information received though external communication modules 450 may be stored in memory units 210, in shared memory units 410, and so forth. In an additional example, information retrieved from memory units 210 and/or shared memory units 410 may be transmitted using external communication modules 450. In another example, input data may be transmitted and/or received using external communication modules 450. Examples of such input data may include: input data inputted by a user using user input devices; information captured from the environment of apparatus 200 using one or more sensors; and so forth. Examples of such sensors may include: audio sensors 250; image sensors 260; motion sensors 270; positioning sensors 275; chemical sensors; temperature sensors; barometers; pressure sensors; proximity sensors; electrical impedance sensors; electrical voltage sensors; electrical current sensors; and so forth.

Figure 6:
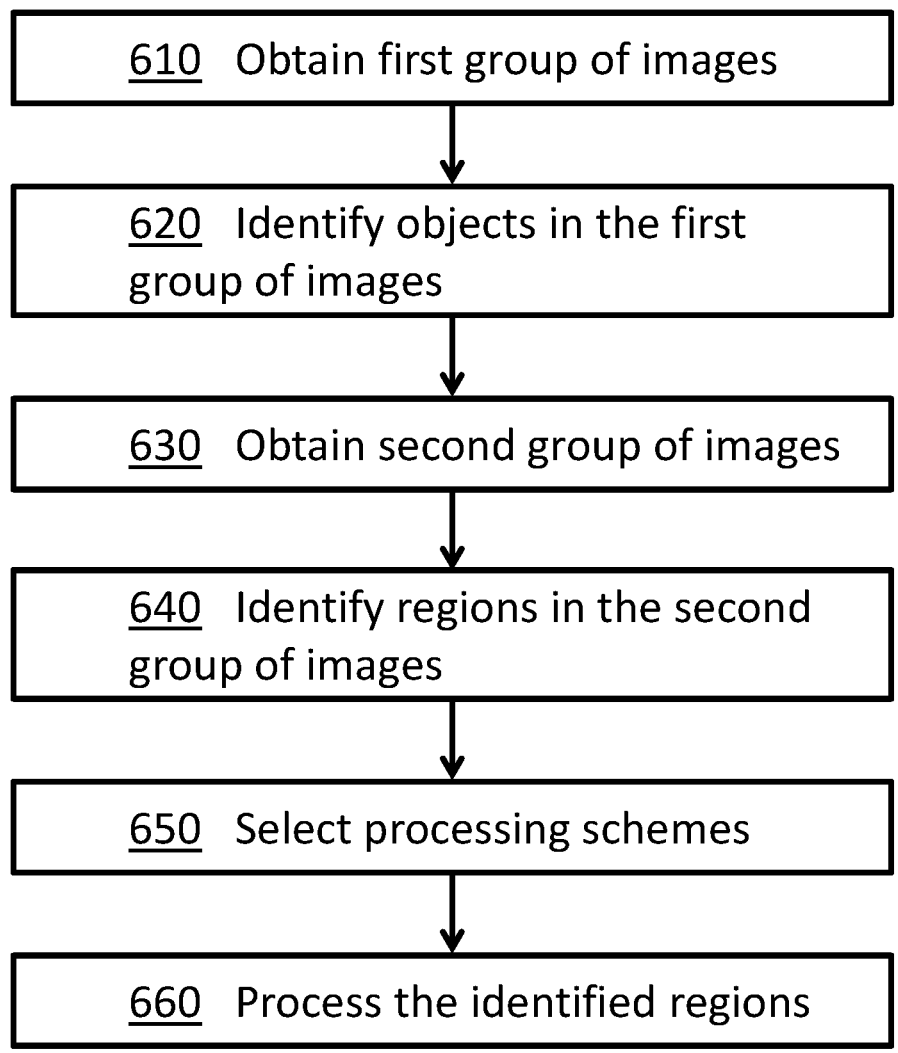
FIG. 6 illustrates an example of a process for selective image processing.

FIG. 6 illustrates an example of process 600 for selective image processing. In some examples, process 600, as well as all individual steps therein, may be performed by various aspects of: apparatus 200; server 300; cloud platform 400; computational node 500; and so forth. For example, process 600 may be performed by processing units 220, executing software instructions stored within memory units 210 and/or within shared memory modules 410. In this example, process 600 may comprise: obtaining first group of images (Step 610); identifying objects in the first group of images (Step 620); obtaining second group of images (Step 630); identifying regions in the second group of images (Step 640); selecting processing schemes (Step 650); and processing the identified regions (Step 660). In some implementations, process 600 may comprise one or more additional steps, while some of the steps listed above may be modified or excluded. For example, in some cases Step 650 may be excluded from process 600. In some implementations, one or more steps illustrated in FIG. 6 may be executed in a different order and/or one or more groups of steps may be executed simultaneously and vice versa. For example, Step 630 and/or Step 640 may be executed before, after and/or simultaneously with Step 610 and/or Step 620; Step 650 may be executed before, after and/or simultaneously with Step 610 and/or Step 620 and/or Step 630 and/or Step 640; Step 660 may be executed after and/or simultaneously with Step 640 and/or Step 650, and so forth. Examples of possible execution manners of process 600 may include: continuous execution, returning to the beginning of the process once the process normal execution ends; periodically execution, executing the process at selected times; execution upon the detection of a trigger, where examples of such trigger may include trigger from a user, trigger from another process, trigger from an external device, etc.; any combination of the above; and so forth.

In some embodiments, obtaining first group of images (Step 610) and/or obtaining second group of images (Step 630) and/or obtaining a stream of images (Step 910) and/or receiving image data (Step 1110) may comprise obtaining image data captured using image sensors (such as image sensors 260). Some examples of such image data may include: images; segments of images; sequence of images; video clips; segments of video clips; video streams; segments of video streams; information based, at least in part, on any of the above; any combination of the above; and so forth.

In some examples, Step 610 and/or Step 630 and/or Step 910 and/or Step 1110 may comprise, in addition or alternatively to obtaining image data and/or other input data, obtaining audio data captured using audio sensors (such as audio sensors 250). Examples of audio data may include: audio recordings; segments of audio recordings; audio streams; segments of audio streams; information based, at least in part, on any of the above; any combination of the above; and so forth.

In some examples, Step 610 and/or Step 630 and/or Step 910 and/or Step 1110 may comprise, in addition or alternatively to obtaining image data and/or other input data, obtaining motion information captured using motion sensors (such as motion sensors 270). Examples of such motion information may include: indications related to motion of objects; measurements related to the velocity of objects; measurements related to the acceleration of objects; indications related to motion of motion sensor 270; measurements related to the velocity of motion sensor 270; measurements related to the acceleration of motion sensor 270; information based, at least in part, on any of the above; any combination of the above; and so forth.

In some examples, Step 610 and/or Step 630 and/or Step 910 and/or Step 1110 may comprise, in addition or alternatively to obtaining image data and/or other input data, obtaining position information captured using positioning sensors (such as positioning sensors 275). Examples of such position information may include: indications related to the position of positioning sensors 275; indications related to changes in the position of positioning sensors 275; measurements related to the position of positioning sensors 275; indications related to the orientation of positioning sensors 275; indications related to changes in the orientation of positioning sensors 275; measurements related to the orientation of positioning sensors 275; measurements related to changes in the orientation of positioning sensors 275; information based, at least in part, on any of the above; any combination of the above; and so forth.

In some embodiments, obtaining first group of images (Step 610) and/or obtaining second group of images (Step 630) and/or obtaining a stream of images (Step 910) and/or receiving image data (Step 1110) may comprise receiving input data using communication devices (such as communication modules 230, internal communication modules 440, external communication modules 450, and so forth). Examples of such input data may include: input data captured using one or more sensors; image data captured using image sensors, for example using image sensors 260; audio data captured using audio sensors, for example using audio sensors 250; motion information captured using motion sensors, for example using motion sensors 270; position information captured using positioning sensors, for example using positioning sensors 275; and so forth.

In some embodiments, obtaining first group of images (Step 610) and/or obtaining second group of images (Step 630) and/or obtaining a stream of images (Step 910) and/or receiving image data (Step 1110) may comprise reading input data from memory (such as memory units 210, shared memory modules 410, and so forth). Examples of such input data may include: input data captured using one or more sensors; image data captured using image sensors, for example using image sensors 260; audio data captured using audio sensors, for example using audio sensors 250; motion information captured using motion sensors, for example using motion sensors 270; position information captured using positioning sensors, for example using positioning sensors 275; and so forth.

In some embodiments, analyzing image data, for example by Step 620 and/or Step 660 and/or Step 720 and/or Step 750 and/or Step 920 and/or Step 930 and/or Step 1120, may comprise analyzing the image data to obtain a preprocessed image data, and subsequently analyzing the image data and/or the preprocessed image data to obtain the desired outcome. One of ordinary skill in the art will recognize that the followings are examples, and that the image data may be preprocessed using other kinds of preprocessing methods. In some examples, the image data may be preprocessed by transforming the image data using a transformation function to obtain a transformed image data, and the preprocessed image data may comprise the transformed image data. For example, the transformed image data may comprise convolutions of the image data. For example, the transformation function may comprise image filters, such as low-pass filters, high-pass filters, band-pass filters, all-pass filters, and so forth. In some examples, the transformation function may comprise a nonlinear function. In some examples, the image data may be preprocessed by smoothing the image data, for example using Gaussian convolution, using a median filter, and so forth. In some examples, the image data may be preprocessed to obtain a different representation of the image data. For example, the preprocessed image data may comprise: a representation of at least part of the image data in a frequency domain; a Discrete Fourier Transform of at least part of the image data; a Discrete Wavelet Transform of at least part of the image data; a time/frequency representation of at least part of the image data; a representation of at least part of the image data in a lower dimension; a lossy representation of at least part of the image data; a lossless representation of at least part of the image data; a time order series of any of the above; any combination of the above; and so forth. In some examples, the image data may be preprocessed to extract edges, and the preprocessed image data may comprise information based on and/or related to the extracted edges. In some examples, the image data may be preprocessed to extract image features from the image data. Some examples of such image features may comprise information based on and/or related to: edges; corners; blobs; ridges; Scale Invariant Feature Transform (SIFT) features; temporal features; and so forth.

In some embodiments, analyzing image data, for example by Step 620 and/or Step 660 and/or Step 720 and/or Step 750 and/or Step 920 and/or Step 930 and/or Step 1120, may comprise analyzing the image data and/or the preprocessed image data using rules, functions, procedures, artificial neural networks, object detection algorithms, face detection algorithms, visual event detection algorithms, action detection algorithms, motion detection algorithms, background subtraction algorithms, inference models, and so forth. Some examples of such inference models may include: an inference model preprogrammed manually; a classification model; a regression model; a result of training algorithms (such as machine learning algorithms and/or deep learning algorithms) on training examples, where the training examples may include examples of data instances, and in some cases, a data instance may be labeled with a corresponding desired label and/or result; and so forth.

In some embodiments, identifying objects in the first group of images (Step 620) may comprise analyzing the image data and/or the preprocessed image data obtain by Step 610 to identify a group of items, objects, faces, events, actions, and so forth, in the image data.

In some examples, identifying objects in the first group of images (Step 620) may comprise using object detection algorithms to detect objects in the image data obtained by Step 610 that match selected criteria. Some examples of such object detection algorithms may include: appearance based object detection algorithms, gradient based object detection algorithms, gray scale object detection algorithms, color based object detection algorithms, histogram based object detection algorithms, feature based object detection algorithms, machine learning based object detection algorithms, artificial neural networks based object detection algorithms, 2D object detection algorithms, 3D object detection algorithms, still image based object detection algorithms, video based object detection algorithms, and so forth.

In some examples, identifying objects in the first group of images (Step 620) may comprise using face detection algorithms to detect faces matching selected criteria in the image data obtained by Step 610, using visual event detection algorithms to detect events matching selected criteria in the image data obtained by Step 610, using action detection algorithms to detect actions matching selected criteria in the image data obtained by Step 610, and so forth.

In some examples, identifying objects in the first group of images (Step 620) may comprise obtaining an indication of the object from a user. For example, object detection and/or recognition algorithms may be used to compile a list of objects present in the image data obtained by Step 610, the list may be presented to a user (for example, as a list of textual descriptions of the objects, as a list of images of the objects, etc.), and the user may select an object from the list. In another example, an image of the image data obtain by Step 610 may be presented to a user, and user may point to an object, may mark a bounding box around an object, and so forth. In yet another example, a candidate object may be presented to a user, and the user may indicate whether this object is acceptable or not. In some cases, the user may also indicate a type of the selected object, which may be used by Step 650 to select a processing scheme.

In some examples, identifying objects in the first group of images (Step 620) may comprise analyzing motion in the image data obtained by Step 610, for example using motion segmentation algorithms, to identify segments that correspond to a moving object. For example, when the image sensor and the background are stationary, any motion in the image data may correspond to moving objects.

In some embodiments, identifying regions in the second group of images (Step 640) may comprise identifying one or more regions of the image data and/or the preprocessed image data obtain by Step 630, for example based on the objects identified by Step 620 in the image data obtained by Step 610. For example, the identified regions may comprise at least a first region and a second region, where the first region may differ from the second region, may include all parts of the image data not included in the second region, may include some parts of the image data not included in the second region, may have no common pixels with the second region, may have some common pixels with the second region, may include all pixels of the second region, and so forth. In some examples, one identified region may comprise all pixels not included in other identified regions, not included in one other selected identified region, not included in a group of selected identified regions, and so forth.

In some embodiments, identifying regions in the second group of images (Step 640) may comprise obtaining an indication of the region from a user. For example, alternative regions may be identified (for example as described above) and presented to a user (for example as an overlay on an image of the image data obtained by Step 610), and the user may select some of the alternative regions. In some cases, the user may also indicate a type of the selected region, which may be used by Step 650 to select a processing scheme.

In some embodiments, one of the regions identified by Step 640 in the image data and/or the preprocessed image data obtained by Step 630 may correspond to a region of the image data obtained by Step 610 depicting all or part of an object identified by Step 620. For example, Steps 610 and 630 may obtain images captured using a stationary image sensor 260 with the same capturing parameters, and an identified region of the image data obtained by Step 630 may comprise some or all of the pixels depicting the object in the image data obtained by Step 610, to a bounding box that includes these pixels, and so forth. In another example, Steps 610 and 630 may obtain images captured using a stationary image sensor 260 but with different capturing parameters, and an identified region of the image data obtained by Step 630 may comprise some or all of the pixels corresponding to the pixels depicting the object in the image data obtained by Step 610 according to a transformation associated with the change in the capturing parameters, to a bounding box that includes these pixels, and so forth. In yet another example, Steps 610 and 630 may obtain images captured using a moving image sensor 260, and an identified region of the image data obtained by Step 630 may comprise at least some of the pixels corresponding to the pixels depicting the object in the image data obtained by Step 610 according to a transformation calculated according to the ego motion of the image sensor and/or to changes in the capturing parameters used, to a bounding box that includes these pixels, and so forth. In another example, Steps 610 and 630 may obtain images captured using different image sensors (for example, using image sensors 260 included in apparatuses 200a and 200b), and an identified region of the image data obtained by Step 630 may comprise at least some of the pixels corresponding to the pixels depicting the object in the image data obtained by Step 610 according to a transformation associated with the image sensors (such as a transformation calculated according to the field of view of the image sensors, to the capturing parameters used by the image sensors, to the position and/or orientation of the image sensors, etc.), to a bounding box that includes these pixels, and so forth.

In some embodiments, selecting processing schemes (Step 650) may comprise selecting a processing scheme of a plurality of alternative processing schemes based on the objects identified by Step 620. For example, a processing scheme may be implemented as a formula, a computer procedure, a computer function, and/or a computer program, and Step 650 may select a formula, a computer procedure, a computer function, and/or a computer program of a plurality of alternative formulas, computer procedures, computer functions, and/or computer programs based on the objects identified by Step 620. In another example, a processing scheme may be represented as a set of parameters (for example to a formula, a computer procedure, a computer function, and/or a computer program), and Step 650 may select a set of parameters of a plurality of alternative sets of parameters based on the objects identified by Step 620. In yet another example, a processing scheme may be implemented as an inference model (such as a classifier, a regression model, an artificial neural network, a segmentation model, and so forth), and Step 650 may select an inference model based on the objects identified by Step 620.

Some additional examples of processing schemes may include ignoring the processed region, processing the region at a selected frame rate and/or frequency, processing the region at a selected resolution, processing the region to determine if the object identified by Step 620 is still present in the region, processing the region only when the average intensity of the region meets certain criteria (for example, is within a selected range of values), processing the region with a selected processing scheme when the average intensity of the region meets certain criteria (for example is within a selected range of values), and so forth.

In some embodiments, selecting processing schemes (Step 650) may comprise determining a processing scheme according to training examples (for example by training a machine learning algorithm and/or a deep learning algorithm and/or an artificial neural network to obtain an inference model from the training examples), and the training examples may be selected of a plurality of possible training examples.

In some embodiments, selecting processing schemes (Step 650) may comprise using a rule to select a processing scheme of a plurality of alternative processing schemes based on the objects identified by Step 620. In some examples, a table may hold the alternative processing schemes (or identifiers of the processing schemes), and Step 650 may access an entry of the table based on the objects identified by Step 620. In some examples, the alternative processing schemes (or identifiers of the processing schemes) may be stored in memory, and Step 650 may fetch the selected processing scheme from the memory.

In some embodiments, processing the identified regions (Step 660) may comprise processing regions identified by Step 640 using processing schemes selected by Step 650. For example, a selected processing scheme may comprise a formula, and Step 660 may evaluate the formula using one of the identified regions. In another example, a selected processing scheme may comprise a computer procedure, a computer function, and/or a computer program, and Step 660 may execute the computer procedure, computer function, and/or computer program using the content of one of the identified regions as a parameter to the computer procedure, computer function, and/or computer program. In yet another example, a selected processing scheme may comprise an inference model, and Step 660 may apply one of the identified regions to the inference model. In another example, according to the selected processing schemes, Step 660 may ignore at least one identified region, process at least one identified region at a selected frame rate and/or frequency, process at least one identified region at a selected resolution, process at least one identified region to determine if an object identified by Step 620 is still present in the region, process at least one identified region only when the average intensity of the region meets certain criteria (for example is within a selected range of values), process at least one identified region with a selected processing scheme when the average intensity of the region meets certain criteria (for example is within a selected range of values), and so forth.

In some examples, Step 660 may also process the entire image data obtained by Step 630 with a selected processing scheme, process at least one selected region identified by Step 640 using a default processing scheme (which may be different from the processing schemes selected by Step 650), process image data obtained by Step 630 and not included in any regions identified by Step 640 using a selected processing scheme, process image data obtained by Step 630 and not included in one or more selected regions of the regions identified by Step 640 using a selected processing scheme, and so forth.

Figure 7:
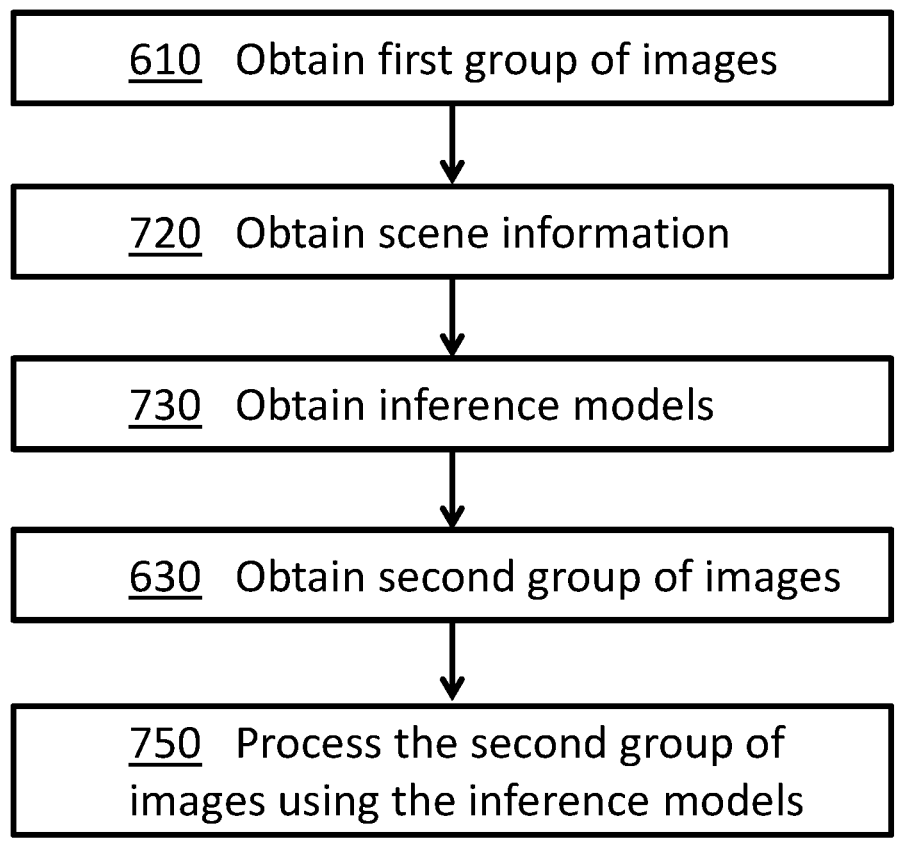
FIG. 7 illustrates an example of a process for selective use of inference models.

FIG. 7 illustrates an example of process 700 for selective use of inference models. In some examples, process 700, as well as all individual steps therein, may be performed by various aspects of: apparatus 200; server 300; cloud platform 400; computational node 500; and so forth. For example, process 700 may be performed by processing units 220, executing software instructions stored within memory units 210 and/or within shared memory modules 410. In this example, process 700 may comprise: obtaining first group of images (Step 610); obtaining scene information (Step 720); obtaining inference models (Step 730); obtaining second group of images (Step 630); and processing the second group of images using the inference models (Step 750). In some implementations, process 700 may comprise one or more additional steps, while some of the steps listed above may be modified or excluded. For example, in some cases Steps 610 and/or 720 may be excluded from process 700. In some implementations, one or more steps illustrated in FIG. 7 may be executed in a different order and/or one or more groups of steps may be executed simultaneously and vice versa. For example, Step 630 may be executed before, after and/or simultaneously with Step 610 and/or Step 720 and/or Step 730; Steps 720 and/or Step 730 may be executed after and/or simultaneously with Step 610; Step 750 may be executed after and/or simultaneously with Step 630; and so forth. Examples of possible execution manners of process 700 may include: continuous execution, returning to the beginning of the process once the process normal execution ends; periodically execution, executing the process at selected times; execution upon the detection of a trigger, where examples of such trigger may include trigger from a user, trigger from another process, trigger from an external device, etc.; any combination of the above; and so forth.

In some embodiments, scene information obtained by Step 720 may comprise information related to data captured using one or more sensors from an environment. For example, the scene information may comprise: information related to the distribution of captured data (for example in the form of frequencies at which different types of information are captured, in the form of a histogram, etc.), minimal levels captured, maximal levels captured, aggregated and/or statistical measurements related to data captured over time, typical captured data instances, results of applying captured data to a clustering algorithm (such as k-means, spectral clustering, etc.), results of applying captured data to a dimensionality reduction algorithm (such as Principal Component Analysis, Canonical Correlation Analysis, etc.), and so forth. In another example, the scene information may comprise information related to items and/or objects present and/or detected in the captured data.

In some embodiments, obtaining scene information (Step 720) may comprise generating the scene information, reading the scene information from memory, receiving the scene information using communication devices (such as communication modules 230, internal communication modules 440, external communication modules 450, etc.), and so forth. In some embodiments, obtaining scene information (Step 720) may comprise generating scene information based, at least in part, on data captured using one or more sensors. Examples of such sensors may include audio sensors 250, image sensors 260, motion sensors 270, positioning sensors 275, chemical sensors, temperature sensors, barometers, pressure sensors, proximity sensors, electrical impedance sensors, electrical voltage sensors, electrical current sensors, and so forth.

In some embodiments, obtaining scene information (Step 720) may comprise analyzing the images obtained by Step 610 to obtain the scene information. In some examples, Step 720 may comprise selecting one or more portions of the images, and the scene information may comprise information related to the selected portions. For example, image sensors 260 may be stationary, a motion analysis of a video may be performed, and the portions of the video that has no or little movement may be selected. In another example, image gradients may be calculated, and the portions of the video that has high variance of gradients may be selected. In another example, face detector may be used to detect faces appearing in the one or more images, and portions of the images containing faces may be selected.

In some examples, obtaining scene information (Step 720) may comprise extracting background from video obtained by Step 610, and the scene information may comprise the extracted background of the environment, information related to the extracted background, and so forth. Examples of algorithms for background extraction may include, taking the median of the video, taking the median of the video after adjusting for ego motion of image sensors 260, taking the mean of the video, taking the mean of the video after adjusting for ego motion of image sensors 260, taking the mode of the video, taking the mode of the video after adjusting for ego motion of image sensors 260, and so forth.

In some examples, obtaining scene information (Step 720) may comprise detecting objects in the images obtained by Step 610, and the scene information may comprise identifying information of the detected objects, information related to the detected objects, positions at which one or more objects were detected, frequencies at which different objects are detected, images of detected objects, and so forth. For example, the scene information may comprise identified properties of the detected object, such as type, size, color, condition, and so forth. In some cases, the scene information may comprise a mapping that specifies for different pixels and/or image regions the objects detected at those pixels and/or regions, the frequencies at which objects are detected at those pixels and/or regions, the frequencies at which specific objects are detected at those pixels and/or regions, and so forth. Some examples of object detection algorithms may include deep learning based object detection algorithms, appearance based object detection algorithms, image features based object detection algorithms, and so forth.

In some examples, obtaining scene information (Step 720) may comprise detecting faces and/or recognizing faces in the images obtained by Step 610, and the scene information may comprise identifying information of the detected and/or recognized faces, information related to the detected and/or recognized faces, positions at which one or more faces were detected, frequencies at which different faces are appearing, images of detected and/or recognized faces, and so forth. For example, the scene information may comprise identified properties of individuals appearing in the images, such as names, ages, gender, hair color, height, weight, and so forth. In some cases, the scene information may comprise information related to people appearing regularly in the images, for example of people appearing in more than a selected number of images, over a selected time span, and so forth. In some cases, the scene information may comprise a mapping that specifies for different pixels and/or image regions the faces detected at these pixels and/or regions, the frequencies at which faces are detected at these pixels and/or regions, the frequencies at which specific faces are detected at these pixels and/or regions, and so forth. Some examples of face detection algorithms that may be used may include deep learning based face detection algorithms, appearance based face detection algorithms, color based face detection algorithms, texture based face detection algorithms, shape based face detection algorithms, motion based face detection algorithms, boosting based face detection algorithms, and so forth. Some examples of face recognition algorithms that may be used may include deep learning based face recognition algorithms, appearance based face recognition algorithms, color based face recognition algorithms, texture based face recognition algorithms, shape based face recognition algorithms, motion based face recognition algorithms, boosting based face recognition algorithms, dimensionality reduction based face recognition algorithms (such as eigenfaces, Fisherfaces, etc.), 3D face recognition algorithms, and so forth.

In some embodiments, obtaining scene information (Step 720) may comprise generating the scene information based, at least in part, on audio data, such as audio data captured using audio sensors 250 from an environment of audio sensors 250. The audio data may be captured using audio sensors 250, read from memory, received using communication devices (such as communication modules 230, internal communication modules 440, external communication modules 450, etc.), and so forth.

In some examples, obtaining scene information (Step 720) may comprise identifying characteristics of the ambient noise present in the audio data captured, and the scene information may comprise the identified characteristics of the ambient noise, a model of the ambient noise, information related to the ambient noise, and so forth. For example, the noise level may be monitored over time, and minimal noise level or histogram of noise levels may be determined. In another example, typical frequencies of ambient noise may be identified, for example by clustering the frequencies present in the audio data when the noise level is below a selected threshold.

In some examples, obtaining scene information (Step 720) may comprise identifying speakers in the audio data, and the scene information may comprise the information related to the identified speakers. For example, voice models may be constructed for the identified speakers, and the scene information may comprise the voice models. In another example, the scene information may comprise information related to the speaking time of the speakers in the audio data, such as the total speaking time of each speaker, the total speaking time for all speakers cumulatively, histogram of the speaking times with respect to time in day, and so forth.

In some embodiments, obtaining inference models (Step 730) may comprise obtaining at least one inference model based, at least in part, on the scene information obtained by Step 720. For example, obtaining the inference model may comprise generating a first inference model for a first scene information, a second inference model for a second scene information, and so forth. In some examples, the scene information may be generated by Step 720, received using one or more communication devices (such as communication modules 230, internal communication modules 440, external communication modules 450, etc.), read from memory (such as memory units 210, shared memory modules 410, etc.), and so forth.

In some examples, the scene information may comprise information and/or parameters that may be used by Step 730 to decide where to obtain the inference models from, which inference models to obtain, which parts of the obtained inference models to use, parameters for modifying the obtained inference models, where to read the inference models from, which inference models to read of a plurality of alternative inference models stored in memory, which parts of the read inference models to use, parameters for modifying the read inference models, and so forth.

In some embodiments, obtaining inference models (Step 730) may comprise selecting an inference model of a plurality of alternative inference models. For example, the plurality of alternative inference models may be stored in memory (such as memory units 210, shared memory modules 410, etc.), and the selection of the inference model may be based, at least in part, on available information, such as the scene information. In some embodiments, obtaining inference models (Step 730) may comprise selecting one or more training examples, and training a machine learning algorithm and/or a deep learning algorithm using the selected training examples. For example, one or more training examples may be selected of a plurality of alternative training examples. For example, the plurality of alternative training examples may be stored in memory (such as memory units 210, shared memory modules 410, etc.), and the selection of the training examples may be based, at least in part, on the scene information. In some embodiments, obtaining inference models (Step 730) may comprise selecting one or more components of an inference model, for example by selecting one or more components of an inference model of a plurality of alternative components. For example, the plurality of alternative components may be stored in memory (such as memory units 210, shared memory modules 410, etc.), and the selection of the components may be based, at least in part, on the scene information.

In some embodiments, at least part of the inference model obtained by Step 730 may be the result of training algorithms, such as machine learning algorithms and deep learning algorithms, on training examples. The training examples may include examples of data instances, and in some cases, each data instance may be labeled with a corresponding desired result. In some examples, the scene information may comprise information related to the training examples, and obtaining inference models (Step 730) may comprise training algorithms based, at least in part, on examples obtained using the scene information. In some examples, the scene information may comprise labels for data instance, and the algorithms may be trained using these labels. In some examples, the scene information may comprise training examples, and the algorithms may be trained using these training examples. In some examples, the scene information may comprise information and/or parameters that may be used for obtaining training examples; and the algorithms may be trained using the training examples obtained based, at least in part, on the information and/or parameters included in the scene information. In some examples, synthetic training examples may be generated, for example by selecting one or more parameters to a template of synthetic training examples based, at least in part, on information included in the scene information.

In some embodiments, at least part of the inference model obtained by Step 730 may comprise one or more artificial neural networks. In some embodiments, obtaining inference models (Step 730) may comprise generating one or more artificial neural network models, for example by selecting one or more parameters of an artificial neural network model, by selecting a portion of an artificial neural network model, by selecting one or more artificial neural network model of a plurality of alternative artificial neural network models, by training an artificial neural network model on training examples, and so forth. In some embodiments, the inference models may comprise at least one of face detector, face recognition model, object detector, motion detector, activity detector, gesture recognition model, image segmentation model, video segmentation models, speaker recognition model, speech recognition model, audio segmentation model, a classifier, a regression model, a segmentation model, a combination of a plurality of inference models, and so forth.

In some embodiments, obtaining inference models (Step 730) may comprise obtaining an inference model based, at least in part, on historical information stored in memory (such as historical information stored in memory units 210 and/or shared memory units 410). For example, the historical information may comprise historical information from previous runs, from previous experience, and so forth. In some examples, the historical information may comprise scene information records, the scene information obtained by Step 720 may be compared to the scene information records, and the inference models may be based, at least in part, on the comparison result. In some examples, the historical information may comprise at least one rule for classifying the scene information, the scene information may be classified using the at least one rule, and the inference models may be based, at least in part, on the classification result. In some examples, the historical information may comprise inference model records, and the inference models may be based, at least in part, on the inference model records.

In some embodiments, obtaining inference models (Step 730) may comprise transmitting to an external device the scene information obtained by Step 720, receiving at least part of the at least one inference model (for example from the external device and/or in response to the transmitted scene information), and the received at least part of the at least one inference model may be based on the transmitted scene information. For example, the external device may receive the transmitted scene information, generate and/or select inference models based on the scene information as described above, and transmit the generated and/or selected inference models back to process 700.

In some embodiments, processing the second group of images using the inference models (Step 750) may comprise analyzing the images obtained by Step 630 using the inference models obtain by Step 730.

In some embodiments, processing the second group of images using the inference models (Step 750) may comprise generating one or more results by applying input data (such as images and data obtained by Step 630) to inference models (for example, to the inference models obtained by Step 730). In some examples, the inference model may comprise artificial neural networks, and the results may comprise at least part of the output of the artificial neural networks, information based on the output of the artificial neural networks, and so forth. In some examples, the inference model may comprise classifiers, and the results may comprise assignment of input data to one or more classes, assignment of portions of the input data to one or more classes, information based on the classifications, and so forth. In some examples, the inference model may comprise regression models, and the results may comprise values assigned to the input data by the regression models, values assigned to portions of the input data by the regression models, information based on the values assigned by the regression models, and so forth. In some examples, the inference model may comprise segmentation models, and the results may comprise information related to one or more segments identified in the input data.

In some examples, the input data may comprise audio data, the inference model may comprise speaker recognition models, and the results may comprise information related to speakers detected in the audio data by the speaker recognition models. Examples of the information related to speakers detected in the audio data may include information related to the identities of the speakers, information related to the voices of the speakers, information related to the content of the speech associated with the speakers, times at which the speakers were detected, audio segments associated with the speakers, and so forth. In some examples, the input data may comprise audio data, the inference model may comprise one or more speech recognition models, and the results may comprise information related to speech detected in the audio data. Examples of the information related to speech may include information related to speakers associated with the speech, information related to voices associated with the speech, times associated with the speech, audio segments containing at least part of the speech, the content of the speech (for example in a textual form), summary of the speech, topics discussed in the speech, and so forth. In some examples, the input data may comprise audio data, the inference model may comprise audio segmentation models, and the results may comprise information related to audio segments extracted from the audio data. In some examples, the input data may comprise audio data, the inference model may comprise source separation models, and the results may comprise information related to audio sources identified in the audio data.

In some examples, the input data may comprise image data, the inference model may comprise face detectors, and the results may comprise information related to faces appearing in the image data and detected by the face detectors. Examples of the information related to the detected faces may include information related to the appearance of the faces, information related to the pose of the faces, information related to facial expressions, image locations at which the faces were detected; times at which the faces were detected, images of the detected faces, and so forth. In some examples, the input data may comprise image data, the inference model may comprise face recognition models, and the results may comprise information related to the identity of people appearing in the image data. In some examples, the input data may comprise image data, the inference model may comprise object detectors, and the results may comprise information related to objects appearing in the image data and detected by the object detectors. Examples of the information related to the detected objects may include object types, image locations at which the objects were detected, times at which the objects were detected, images of the detected objects, and so forth. In some examples, the input data may comprise image data, the inference model may comprise one or more motion detectors, and the results may comprise information related to motion detected in the image data. In some examples, the input data may comprise image data, the inference model may comprise activity detectors, and the results may comprise information related to activities detected in the image data. In some examples, the input data may comprise image data, the inference model may comprise gesture recognition models, and the results may comprise information related to gestures detected in the image data. In some examples, the input data may comprise image data, the inference model may comprise image segmentation models and/or video segmentation models, and the results may comprise information related to image and/or video segments extracted from the image data.

In some examples, the input data may comprise image data, the inference model may identify one or more pixels and/or voxels, and the results may comprise the identified pixels and/or voxels and/or information related to the identified pixels and/or voxels. In some examples, the input data may comprise image data, the inference model may identify portions and/or regions of the image data, and the results may comprise the identified portions and/or regions of the image data, information related to the identified portions and/or regions of the image data, and so forth. In some examples, the input data may comprise image data, and the results may comprise an association of values with portions and/or regions of the image data, for example in the form of a mapping that maps portions and/or regions of the image data to values.

In some examples, the input data may comprise information associated with a plurality of locations, the inference model may identify locations based, at least in part, on the information associated with a plurality of locations, and the results may comprise the identified one or more locations and/or information related to the identified locations. In some examples, the input data may comprise information associated with locations and/or areas, the inference model may identify locations and/or areas based, at least in part, on the associated information, and the results may comprise the identified location and/or areas; information related to the identified locations and/or areas, and so forth. In some examples, the results may comprise an association of values with locations and/or areas, for example in the form of a mapping that maps locations and/or areas to values.

In some examples, the input data may comprise information associated with a plurality of times, the inference model may identify one or more times based, at least in part, on the information associated with a plurality of times, and the results may comprise the identified one or more times and/or information related to the identified one or more times. In some examples, the input data may comprise information associated with one or more time ranges, the inference model may identify one or more times and/or one or more time ranges based, at least in part, on the associated information, and the results may comprise: the identified one or more times and/or one or more time ranges; information related to the identified one or more times and/or one or more time ranges; and so forth. In some examples, the results may comprise an association of values with times and/or ranges of times, for example in the form of a mapping that maps times and/or ranges of times to values.

Figure 8A:
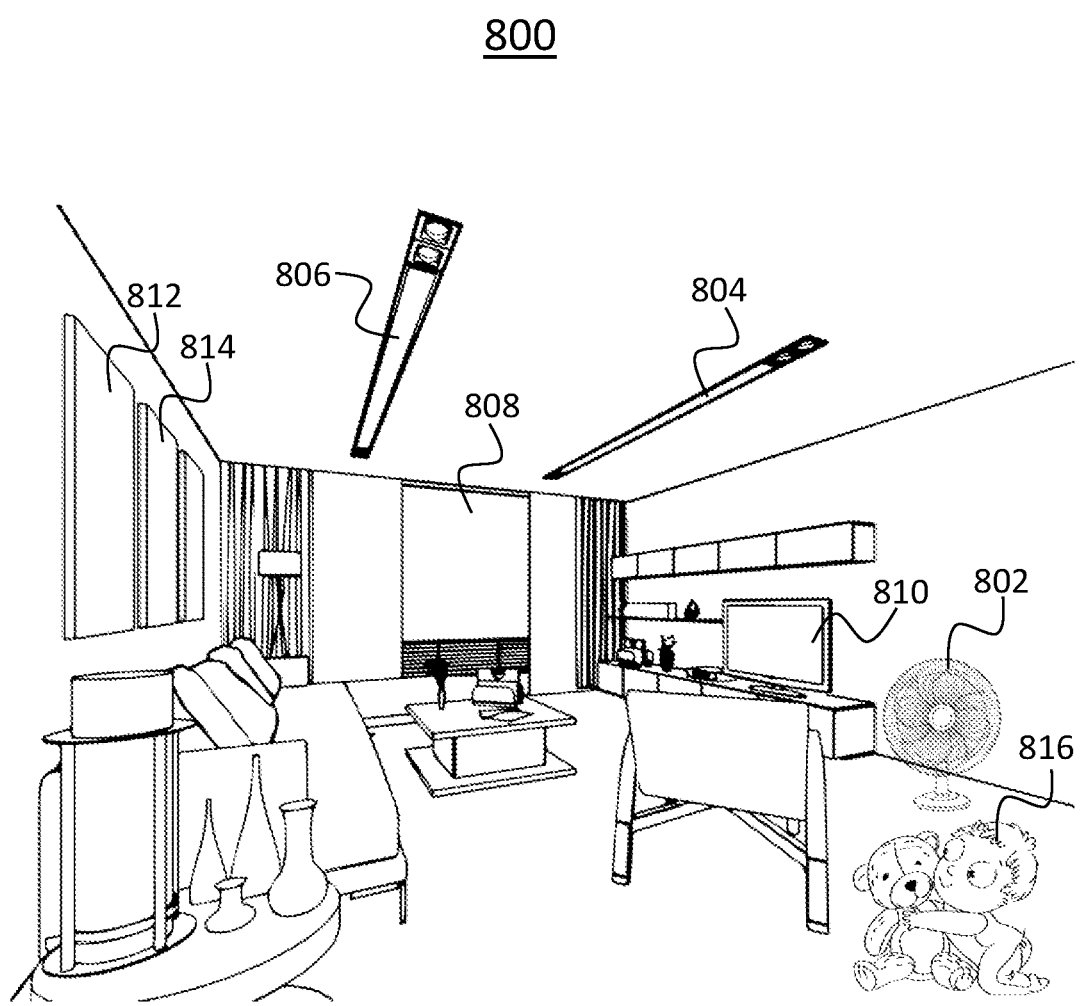
FIG. 8A is a schematic illustration of an example of an environment of a room.

FIG. 8A is a schematic illustration of an example of environment 800 of a room. In this example, environment 800 may comprise fan 802, blinking light source 804, non-blinking light source 806, window 808, television set 810, mirror 812, picture 814, and child 816.

In some examples, process 600 may capture image data of environment 800 using Step 610 and Step 630, and Step 620 may detect fan 802 in the image data captured by Step 610. Step 640 may identify regions in the image data captured by Step 630 corresponding to the location at which fan 802 was detected in the image data captured by Step 610. Based on the detection of fan 802, Step 650 may select a processing scheme. Some examples of the selected processing scheme may include ignoring motion, ignoring motion of fan 802, determining the speed and/or settings of fan 802, and so forth. Step 660 may apply the selected processing scheme to the regions identified by Step 640.

In some examples, process 700 may capture image data of environment 800 using Step 610 and Step 630, and Step 720 may detect fan 802 in the image data captured by Step 610 and generate scene information specifying the present of fan 802. Step 730 may select and/or receive and/or generate an inference model based on the scene information. For example, the inference model may be configured to detect safety events associated with fan 802, to determine the settings and/or speed of fan 802, and so forth. Step 750 may process the image data captured by Step 630 using the inference model. For example, Step 750 may process the image data captured by Step 630 using the inference model to detect safety events related to fan 802, such as a child coming near fan 802, a child playing with fan 802, a child sticking a finger into fan 802, and so forth. In some cases, process 700 may further comprise issuing a warning in response to the detection of the safety event, for example through an audio speaker, through a text message to a care giver, and so forth.

In some examples, process 600 may capture image data of environment 800 using Step 610 and Step 630, and Step 620 may detect blinking light source 804 and/or non-blinking light source 806 in the image data captured by Step 610. Step 640 may identify regions in the image data captured by Step 630 corresponding to the locations at which blinking light source 804 and/or non-blinking light source 806 were detected in the image data captured by Step 610. Based on the detection of blinking light source 804 and/or non-blinking light source 806, Step 650 may select two processing schemes. Some examples of the selected processing scheme may include ignoring changes in the image data in a specified region, ignoring blinking of blinking light source 804, determining if blinking light source 804 and/or non-blinking light source 806 are active, measuring the light intensity of blinking light source 804 and/or non-blinking light source 806, and so forth. Step 660 may apply one of the selected processing schemes to the region identified by Step 640 as corresponding to blinking light source 804, and another one of the selected processing schemes to the region identified by Step 640 as corresponding to non-blinking light source 806.

In some examples, process 700 may capture image data of environment 800 using Step 610 and Step 630, and Step 720 may detect blinking light source 804 and/or non-blinking light source 806 in the image data captured by Step 610 and generate scene information specifying the present of blinking light source 804 and/or non-blinking light source 806. Step 730 may select and/or receive and/or generate inference models based on the scene information. For example, the inference models may be configured to determining if blinking light source 804 and/or non-blinking light source 806 are active, measure the light intensity of blinking light source 804 and/or non-blinking light source 806, and so forth. Step 750 may process the image data captured by Step 630 using the inference models.

In some examples, process 600 may capture image data of environment 800 using Step 610 and Step 630, and Step 620 may detect window 808 in the image data captured by Step 610. Step 640 may identify regions in the image data captured by Step 630 corresponding to the location at which window 808 was detected in the image data captured by Step 610. Based on the detection of window 808, Step 650 may select a processing scheme. Some examples of the selected processing scheme may include ignoring objects and/or motion, ignoring objects and/or motion seen through window 808, ignoring reflections on window 808, determining whether the window is open or close, and so forth. Step 660 may apply the selected processing scheme to the regions identified by Step 640.

In some examples, process 700 may capture image data of environment 800 using Step 610 and Step 630, and Step 720 may detect window 808 in the image data captured by Step 610 and generate scene information specifying the present of window 808. Step 730 may select and/or receive and/or generate an inference model based on the scene information. For example, the inference model may be configured to compensate for reflections on window 808, ignore objects and/or motion seen through window 808, ignore reflections on window 808, determine whether the window is open or close, determine whether an object seen in the region of the window is inside the room or outside the room, and so forth. Step 750 may process the image data captured by Step 630 using the inference model.

In some examples, process 600 may capture image data of environment 800 using Step 610 and Step 630, and Step 620 may detect television set 810 in the image data captured by Step 610. Step 640 may identify regions in the image data captured by Step 630 corresponding to the location at which television set 810 was detected in the image data captured by Step 610. Based on the detection of television set 810, Step 650 may select a processing scheme. Some examples of the selected processing scheme may include ignoring objects and/or motion, ignoring objects and/or motion seen on the screen of television set 810, ignoring reflections on the screen of television set 810, determining whether television set 810 is switched on or off, identifying a channel and/or a program and/or content displayed on television set 810, and so forth. Step 660 may apply the selected processing scheme to the regions identified by Step 640. In another example, Step 640 may identify regions in the image data captured by Step 630 corresponding to positions that are in front of television set 810 in the image data captured by Step 610, Step 650 may select a processing scheme that counts the number of people sitting in the identified regions, and Step 660 may apply the selected processing scheme to the regions identified by Step 640.

In some examples, process 700 may capture image data of environment 800 using Step 610 and Step 630, and Step 720 may detect television set 810 in the image data captured by Step 610 and may generate scene information specifying the present of television set 810. Step 730 may select and/or receive and/or generate an inference model based on the scene information. For example, the inference model may be configured to ignore objects and/or motion seen on television set 810, ignore reflections on television set 810, determine whether television set 810 is switched on or off, identify a channel and/or a program and/or content displayed on television set 810, count the number of people watching television set 810, and so forth. Step 750 may process the image data captured by Step 630 using the inference model.

In some examples, process 600 may capture image data of environment 800 using Step 610 and Step 630, and Step 620 may detect mirror 812 in the image data captured by Step 610. Step 640 may identify regions in the image data captured by Step 630 corresponding to the location at which mirror 812 was detected in the image data captured by Step 610. Based on the detection of mirror 812, Step 650 may select a processing scheme. Some examples of the selected processing scheme may include ignoring objects and/or motion, ignoring objects and/or motion seen on mirror 812, ignoring reflections on mirror 812, and so forth. Step 660 may apply the selected processing scheme to the regions identified by Step 640.

In some examples, process 700 may capture image data of environment 800 using Step 610 and Step 630, and Step 720 may detect mirror 812 in the image data captured by Step 610 and generate scene information specifying the present of mirror 812. Step 730 may select and/or receive and/or generate an inference model based on the scene information. For example, the inference model may be configured to ignore objects and/or motion seen on mirror 812, ignore reflections on mirror 812, compensate for reflections on mirror 812, determine whether an object seen in the region of image corresponding to mirror 812 is a reflection or not, and so forth. Step 750 may process the image data captured by Step 630 using the inference model.

In some examples, process 600 may capture image data of environment 800 using Step 610 and Step 630, and Step 620 may detect picture 814 in the image data captured by Step 610. Step 640 may identify regions in the image data captured by Step 630 corresponding to the location at which picture 814 was detected in the image data captured by Step 610. Based on the detection of picture 814, Step 650 may select a processing scheme. Some examples of the selected processing scheme may include ignoring objects, ignoring stationary objects, ignoring objects depicted in picture 814, and so forth. Step 660 may apply the selected processing scheme to the regions identified by Step 640.

In some examples, process 700 may capture image data of environment 800 using Step 610 and Step 630, and Step 720 may detect picture 814 in the image data captured by Step 610 and generate scene information specifying the present of picture 814. Step 730 may select and/or receive and/or generate an inference model based on the scene information. For example, the inference model may be configured to ignore objects depicted in picture 814, determine whether an object seen in the region of an image corresponding to picture 814 is part of the picture or not, and so forth. For example, the inference model may compare the image data captured by Step 630 to an image of picture 814 as captured by Step 610. Step 750 may process the image data captured by Step 630 using the inference model.

In some examples, process 700 may capture image data of environment 800 using Step 610 and Step 630, and Step 720 may detect child 816 in the image data captured by Step 610 and generate scene information specifying the present of child 816. Step 730 may select and/or receive and/or generate an inference model based on the scene information. For example, the inference model may be configured to detect safety events associated with children, to identify and/or summarize the activities of child 816, and so forth. Step 750 may process the image data captured by Step 630 using the inference model.

In some examples, process 700 may capture image data of an environment using Step 610 and Step 630, and Step 720 may detect a pet in the image data captured by Step 610 and generate scene information specifying the present of the pet. Step 730 may select and/or receive and/or generate an inference model based on the scene information. For example, the inference model may be configured to detect safety events associated with the pet, to identify and/or record the activities of the pet, to determine a state associated with the pet, and so forth. Step 750 may process the image data captured by Step 630 using the inference model.

Figure 8B:
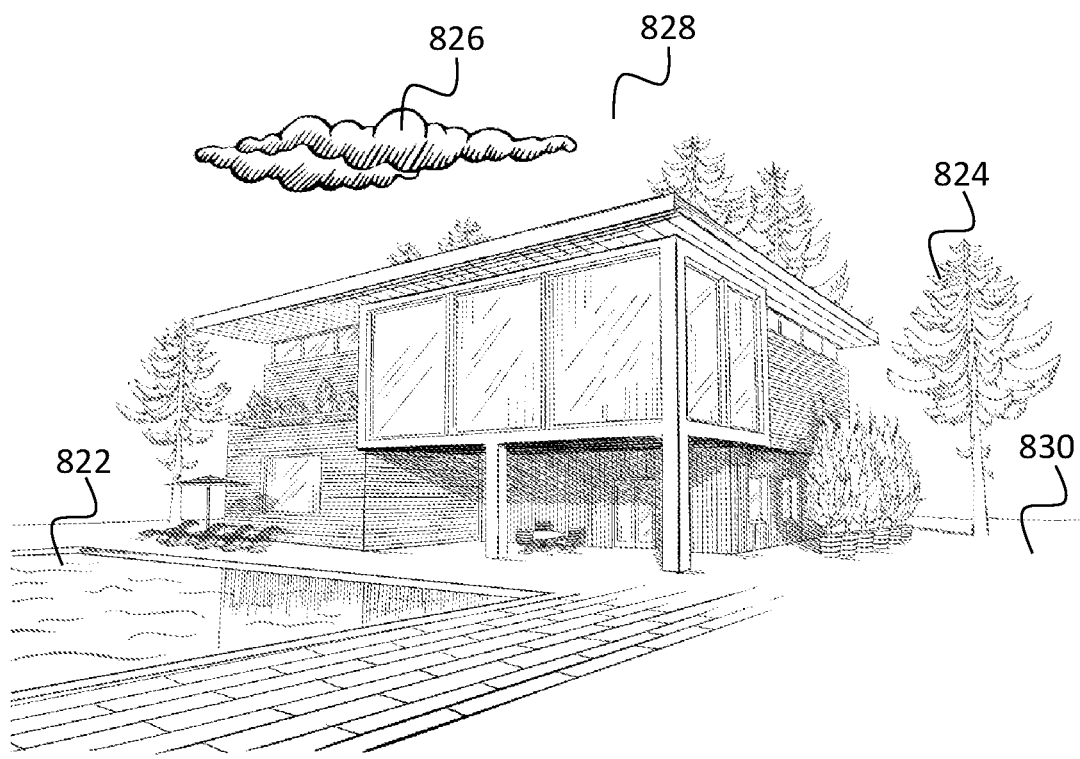
FIG. 8B is a schematic illustration of an example of an environment of a yard.

FIG. 8B is a schematic illustration of an example of environment 820 of a yard. In this example, environment 820 may comprise swimming pool 822, tree 824, clouds 826, sky 828, and yard surface 830.

In some examples, process 600 may capture image data of environment 820 using Step 610 and Step 630, and Step 620 may detect swimming pool 822 in the image data captured by Step 610. Step 640 may identify regions in the image data captured by Step 630 corresponding to the location at which swimming pool 822 was detected in the image data captured by Step 610. Based on the detection of swimming pool 822, Step 650 may select a processing scheme. Some examples of the selected processing scheme may include ignoring texture and/or motion, ignoring texture and/or motion of water in swimming pool 822, ignoring reflections on the water surface of swimming pool 822, correcting the image for refraction due to the water in swimming pool 822, and so forth. Step 660 may apply the selected processing scheme to the regions identified by Step 640.

In some examples, process 700 may capture image data of environment 820 using Step 610 and Step 630, and Step 720 may detect swimming pool 822 in the image data captured by Step 610 and generate scene information specifying the present of swimming pool 822. Step 730 may select and/or receive and/or generate an inference model based on the scene information. For example, the inference model may be configured to detect safety events associated with swimming pool 822, detect drowning in swimming pool 822, identify unsupervised use of swimming pool 822 by a child, ignore texture and/or motion, ignore texture and/or motion of water in swimming pool 822, ignore reflections on the water surface of swimming pool 822, correct refractions due to the water in swimming pool 822, and so forth. Step 750 may process the image data captured by Step 630 using the inference model. In another example, based on scene information constructed by Step 720 in response to the detection of child 816 in the house and swimming pool 822 in the yard, Step 730 may select and/or receive and/or generate an inference model to identify unsupervised use of swimming pool 822 by a child.

In some examples, process 600 may capture image data of environment 820 using Step 610 and Step 630, and Step 620 may detect tree 824 in the image data captured by Step 610. Step 640 may identify regions in the image data captured by Step 630 corresponding to the location at which tree 824 was detected in the image data captured by Step 610. Based on the detection of tree 824, Step 650 may select a processing scheme. Some examples of the selected processing scheme may include ignoring texture and/or motion, ignoring texture and/or motion of leafs of tree 824, and so forth. Step 660 may apply the selected processing scheme to the regions identified by Step 640.

In some examples, process 700 may capture image data of environment 820 using Step 610 and Step 630, and Step 720 may detect tree 824 in the image data captured by Step 610 and generate scene information specifying the present of tree 824. Step 730 may select and/or receive and/or generate an inference model based on the scene information. For example, the inference model may be configured to detect safety events associated with tree 824, identify unsupervised climbing of a child on tree 824, ignore texture and/or motion, ignore texture and/or motion of leafs of tree 824, and so forth. Step 750 may process the image data captured by Step 630 using the inference model. In another example, based on scene information constructed by Step 720 in response to the detection of child 816 in the house and tree 824 in the yard, Step 730 may select and/or receive and/or generate an inference model to identify unsupervised climbing of a child on tree 824.

In some examples, process 600 may capture image data of environment 820 using Step 610 and Step 630, and Step 620 may detect clouds 826 and/or sky 828 in the image data captured by Step 610. Step 640 may identify regions in the image data captured by Step 630 corresponding to the location at which clouds 826 and/or sky 828 were detected in the image data captured by Step 610. Based on the detection of clouds 826 and/or sky 828, Step 650 may select a processing scheme. Some examples of the selected processing scheme may include ignoring texture and/or motion, ignoring texture and/or motion of clouds, ignoring birds, ignoring airplanes, detecting birds, detecting airplanes, and so forth. Step 660 may apply the selected processing scheme to the regions identified by Step 640.

In some examples, process 700 may capture image data of environment 820 using Step 610 and Step 630, and Step 720 may detect clouds 826 and/or sky 828 in the image data captured by Step 610 and generate scene information specifying the present of clouds 826 and/or sky 828. Step 730 may select and/or receive and/or generate an inference model based on the scene information. For example, the inference model may be configured to ignore texture and/or motion, ignore texture and/or motion of clouds, ignore birds, ignore airplanes, detect birds, detect airplanes, count birds, count airplanes, and so forth. Step 750 may process the image data captured by Step 630 using the inference model.

In some examples, process 600 may capture image data of environment 820 using Step 610 and Step 630, and Step 620 may detect yard surface 830 in the image data captured by Step 610. Step 640 may identify regions in the image data captured by Step 630 corresponding to the location at which yard surface 830 was detected in the image data captured by Step 610. Based on the detection of yard surface 830, Step 650 may select a processing scheme. For example, the selected processing scheme may include ignoring texture and/or motion. In another example, the yard surface 830 may be covered with grass, and the selected processing scheme may include ignoring texture and/or motion of the grass. In yet another example, the yard surface 830 may be covered with sand, and the selected processing scheme may include ignoring the texture of the sand. Step 660 may apply the selected processing scheme to the regions identified by Step 640.

In some examples, process 700 may capture image data of environment 820 using Step 610 and Step 630, and Step 720 may detect yard surface 830 in the image data captured by Step 610 and generate scene information specifying the present of yard surface 830. Step 730 may select and/or receive and/or generate an inference model based on the scene information. For example, the inference model may be configured to ignore texture and/or motion of the yard surface, to detect intruders, and so forth. Step 750 may process the image data captured by Step 630 using the inference model.

Figure 9:
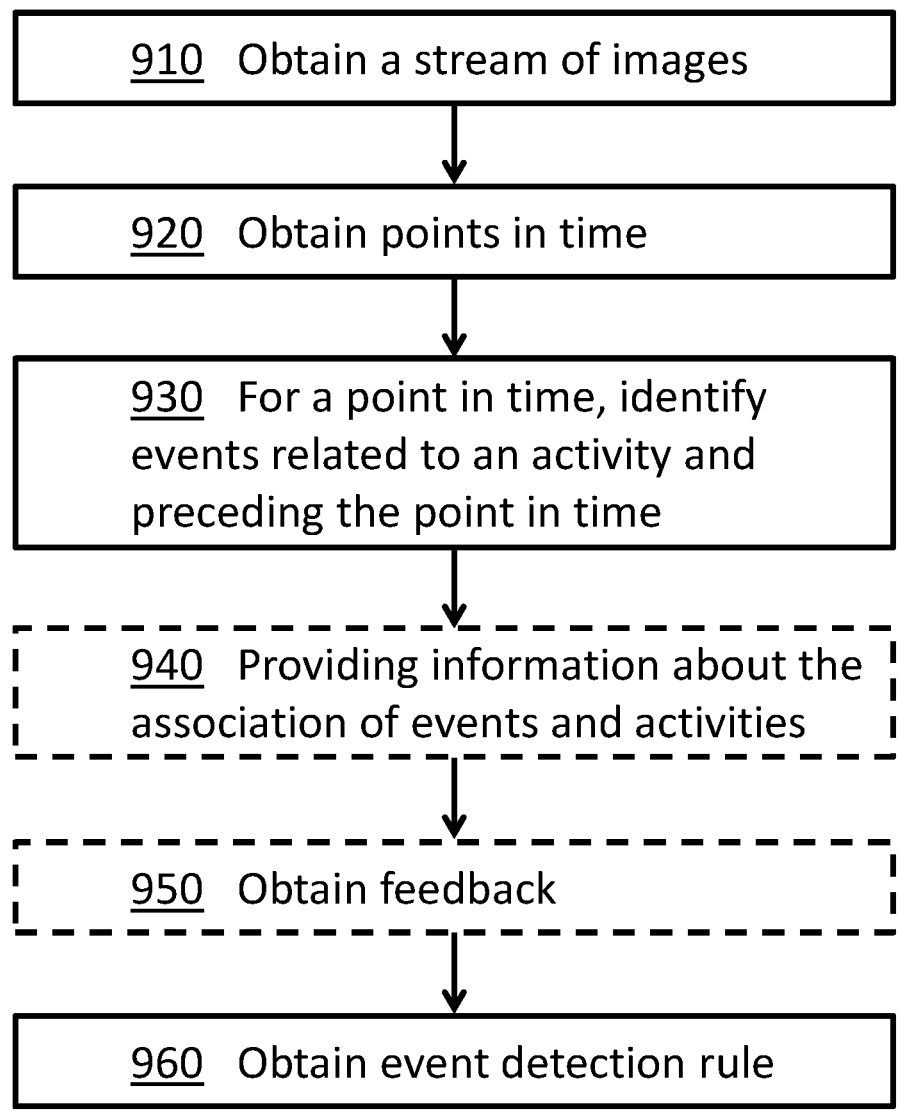
FIG. 9 illustrates an example of a process for facilitating learning of visual events.

FIG. 9 illustrates an example of a process 900 for facilitating learning of visual events. In some examples, process 900, as well as all individual steps therein, may be performed by various aspects of: apparatus 200; server 300; cloud platform 400; computational node 500; and so forth. For example, process 900 may be performed by processing units 220, executing software instructions stored within memory units 210 and/or within shared memory modules 410. In this example, process 900 may comprise: obtaining a stream of images (Step 910); obtaining points in time (Step 920); for a point in time, identifying events related to an activity and preceding the point in time (Step 930); providing information about the association of events and activities (Step 940); obtaining feedback (Step 950); and obtaining event detection rule (Step 960). In some implementations, process 900 may comprise one or more additional steps, while some of the steps listed above may be modified or excluded. For example, in some cases Steps 940 and/or 950 and/or 960 may be excluded from process 900. In some implementations, one or more steps illustrated in FIG. 9 may be executed in a different order and/or one or more groups of steps may be executed simultaneously and vice versa. For example, Step 920 may be executed before, after and/or simultaneously with Step 910, and so forth. In some implementations, process 900 may repeat Step 930 for a plurality of points in time. Examples of possible execution manners of process 900 may include: continuous execution, returning to the beginning of the process once the process normal execution ends; periodically execution, executing the process at selected times; execution upon the detection of a trigger, where examples of such trigger may include trigger from a user, trigger from another process, trigger from an external device, etc.; any combination of the above; and so forth.

In some embodiments, obtaining a stream of images (Step 910) may comprise obtaining a stream of images captured using at least one image sensor from an environment, for example as described above. In some embodiments, obtaining a stream of images (Step 910) may comprise, in addition or alternatively to obtaining the stream of images, obtaining other inputs, for example as described above.

In some embodiments, obtaining points in time (Step 920) may comprise obtaining points in time associated with at least one activity, for example by analyzing input data to determine the points in time. The points in time may correspond to specific images and/or group of images in the stream of images obtained by Step 910.

In some examples, the input data may comprise the stream of images obtained by Step 910, Step 920 may analyze the stream of images to identify images and/or group of images in the stream of images, and the identified images and/or group of images may define the points in time. For example, Step 920 may analyze the stream of images to identify images and/or group of images depicting at least one of a person being injured, an accident occurring, people running, people running from a place, people running towards a place, etc., and the points in time may correspond to the identified images and/or group of images. In some examples, the stream of images may be analyzed using an object detection algorithms, and the points in time may correspond to the first and/or last and/or selected appearances of objects in the stream of images. In some examples, the stream of images may be analyzed using an event detection algorithms and/or action detection algorithm, and the points in time may correspond to the detected events and/or actions. In some examples, the stream of images may be analyzed using a machine learning algorithm and/or an artificial neural net trained to detected selected items in the stream of images and/or selected points in time according based on the stream of images. For example, the machine learning algorithm and/or the artificial neural net may be trained using training examples, and a training example may comprise sample images along with labels corresponding to items in the sample images and/or points in time corresponding to the images.

In some examples, the input data may comprise input data that is synchronized with the stream of images obtained by Step 910, Step 920 may analyze the input data to identify the points in time, and in some cases Step 920 may further determine images and/or group of images of the stream of images corresponding to the identified points in time. In some examples, the input data may comprise input data that is synchronized with a second clock and the stream of images obtained by Step 910 may also be synchronized with a clock, Step 920 may analyze the input data to identify the points in time, and in some cases Step 920 may further determine images and/or group of images of the stream of images corresponding to the identified points in time based on the time of the two clocks.

In some examples, the input data may comprise audio data, Step 920 may analyze the audio data to identify the points in time, and in some cases, Step 920 may further determine images and/or group of images of the stream of images corresponding to the identified points in time as described above. For example, Step 920 may analyze the audio data to detect in the audio data at least of one of a verbal warning, a rebuke, a yelling, a call for help, an alarm sound, etc., and the points in time may correspond to the detected items in the audio data. In some examples, the audio data may be processed using a speech to text algorithm, and the resulting textual information may be analyzed using a natural language processing algorithm to detect textual information corresponding to items in the audio data and/or to identify the points in time directly. In some examples, the pitch of the audio data may be analyzed, for example using a threshold, to identify the points in time directly. In some examples, the audio data may be analyzed using a speaker diarization algorithms and/or speaker recognition algorithms, and the detection of the points in time may be based on the analysis results. In some examples, the audio data may be analyzed using a machine learning algorithm and/or an artificial neural net trained to detected selected items in the audio data and/or selected points in time. For example, the machine learning algorithm and/or the artificial neural net may be trained using training examples, and a training example may comprise sample audio data along with labels corresponding to items and/or points in time in the sample audio data.

In some examples, the input data may comprise data stream from an external electronic device, Step 920 may analyze the data stream to identify the points in time, and in some cases, Step 920 may further determine images and/or group of images of the stream of images corresponding to the identified points in time as described above. Some examples of such external electronic device may include a computerized device, a telephone, a smartphone, a tablet, a personal computer, a television set, an electronic media center, a car, an autonomous car, and so forth. For example, the data stream may comprise an indication and/or details of a phone call, and Step 920 may identify points in time corresponding to the phone calls, to some selected phone calls, to phone calls to an emergency center, to phone calls to a delivery service, to phone calls to restaurants, to phone calls to car service, and so forth. In another example, the data stream may comprise an indication and/or details of a usage of an application and/or a software product, and Step 920 may identify points in time corresponding to the usage of the application and/or the software product, to selected usages of the application and/or the software product, to a usage of the application and/or the software product for accessing selected information, to a contact to a with an emergency center and/or service using the application and/or the software product, to an ordering of a delivery using the application and/or the software product, to an ordering of food using the application and/or the software product, to an ordering of products using the application and/or the software product, to an ordering of a car service using the application and/or the software product, and so forth. In yet another example, the data stream may comprise an indication and/or details of accesses to a web and/or online services, and Step 920 may identify points in time corresponding to the accesses to the web and/or online services, to selected accesses to the web and/or online services, to accesses to selected web and/or online services, to an access to a web and/or online service of an emergency service, to an access to a web and/or online service of a delivery service, to an access to a web and/or online service of a restaurant, to an access to a web and/or online service of a car service, and so forth. In yet another example, the data stream may comprise one or more points in time identified by an external device and/or an external service.

In some examples, the input data may comprise inputs from a user, Step 920 may analyze the inputs to identify the points in time, and in some cases, Step 920 may further determine images and/or group of images of the stream of images corresponding to the identified points in time as described above. Some examples of such inputs from users may include key presses, voice commands, hand gestures, and so forth. For example, an input from a user may signal Step 920 that the current time should be recognized as a point in time, that a time corresponding to a previous activity should be recognized as a point in time, and so forth.

In some embodiments, identifying events related to an activity and preceding a point in time (Step 930) may be repeated for one, some or all points in time obtained by Step 920. In some examples, identifying events related to an activity and preceding a point in time (Step 930) may comprise analyzing the stream of images obtained by Step 910 to identify one or more events related to at least one activity associated with the point in time and preceding the point in time. For example, a point in time may correspond to specific images and/or group of images in the stream of images obtained by Step 910, and Step 930 may analyze images preceding the images and/or group of images that corresponds to the point in time to identify one or more events related to at least one activity associated with the point in time.

In some examples, the point in time may correspond to a person being injured and/or to an accident occurring, for example to a depiction of a person being injured and/or of an accident occurring in the stream of images, and Step 930 may analyze the images preceding the injury and/or the accident to identify events leading to the injury and/or the accident, such as a person running, a person using a piece of equipment without proper safety equipment, hazardous conditions in the environment, malfunction equipment, and so forth. In some examples, the point in time may correspond to people running, people running from a place, people running towards a place, etc., for example to a depiction of people running in the stream of images, and Step 930 may analyze the images preceding the running to identify an event causing the people to run, such as an injury, an accident, a safety event, and so forth.

In some examples, the point in time may correspond to a verbal warning and/or a rebuke and/or a yelling, for example to a verbal warning and/or a rebuke and/or a yelling detected by Step 920 in an audio data, and Step 930 may analyze the images preceding the time of the verbal warning and/or the rebuke and/or the yelling to identify an event leading to the verbal warning and/or the rebuke and/or the yelling, such as an inappropriate behavior, a safety related event, a person failing to perform a task, and so forth. In some examples, the point in time may correspond to a call for help and/or a cry of pain, for example to a call for help and/or a cry of pain detected by Step 920 in an audio data, and Step 930 may analyze the images preceding the time of the call for help and/or the cry of pain to identify an event leading to the call for help and/or the cry of pain, such as an injury, an accident, a safety event, and so forth. In some examples, the point in time may correspond to an alarm sound, for example to an alarm sound detected by Step 920 in an audio data, and Step 930 may analyze the images preceding the time of the alarm sound to identify an event leading to the alarm, such as an injury, an accident, a safety event, and so forth.

In some examples, the point in time may correspond to a phone call (such as a phone call to an emergency center, to a delivery service, to a restaurant, to a car service, etc.), and Step 930 may analyze the images preceding the time of the phone call to identify events leading to the phone call, such as an emergency situation, an injury, an accident, a safety related event, opening of a refrigerator, opening of a door, grabbing of a bag and/or a coat, existing a room and/or a house, and so forth. In some examples, the point in time may correspond to a usage of an application and/or a software product (such as usage of the application and/or the software product to access selected information, to contact an emergency center and/or service, to order a delivery, to order food, to order products, to order a car service, etc.), and Step 930 may analyze the images preceding the time of the usage of the application and/or the software product to identify events leading to the usage of the application and/or the software product, such as an emergency situation, an injury, an accident, a safety related event, opening of a refrigerator, opening of a door, grabbing of a bag and/or a coat, existing a room and/or a house, and so forth. In some examples, the point in time may correspond to an access to a web service (such as accessing a web service to obtain information, to contact an emergency service, to order a delivery, to order from a restaurant, to order a car service, etc.), and Step 930 may analyze the images preceding the time of the access to the web service to identify events leading to the access to the web service, such as an emergency situation, an injury, an accident, a safety related event, opening of a refrigerator, opening of a door, grabbing of a bag and/or a coat, existing a room and/or a house, and so forth.

In some examples, the point in time may correspond to an input from a user (for example, in the form of a key press, a voice command, a hand gesture, etc.), and Step 930 may analyze the images preceding the time of the user input to identify events associated and/or leading to the user input.

In some examples, Step 930 may analyze the images preceding the point in time using object detection algorithms to detect events that comprise a present of a selected object in an environment. In some examples, Step 930 may analyze the images preceding the point in time using an event detection algorithms and/or action detection algorithm to detect events that comprise the occurrence of a selected event and/or the performance of a selected action. In some examples, Step 930 may analyze the images preceding the point in time using a machine learning algorithm and/or an artificial neural net trained to detected selected events in a stream of images. For example, the machine learning algorithm and/or the artificial neural net may be trained using training examples, and a training example may comprise sample images along with labels corresponding to events in the sample images.

In some embodiments, providing information about the association of events and activities (Step 940) may comprise providing information related to points in time obtained by Step 920 and/or to activities identified by Step 920 and/or to events identified by Step 930. In some examples, one or more alternatives associations of activities and/or events and/or points in time may be provided to the user, and in some cases the user may select associations out of the alternative associations. In some examples, the information may be provided visually, for example using a graphical user interface, using a web site, using a display system, using an augmented reality system, using a virtual reality system, in a printed form, and so forth. For example, Step 940 may visually present to a user a graph depicting associations of activities and/or events and/or points in time, or a table listing the associations. In some cases, the activities and/or events and/or points in time may be presented using images depicting the activities and/or events and/or points in time, for example using images selected from the stream of images obtained by Step 910. In some cases, the activities and/or events and/or points in time may be presented as textual information describing the activities and/or events and/or points in time. In some examples, the information may be provided audibly, for example through audio speakers, using head set, and so forth. For example, a list of associations of activities and/or events and/or points in time may be read aloud. In another example, activities and/or events and/or points in time may be described literally, for example by taking textual information describing the activities and/or events and/or points in time, and converting it to audible output using text to speech algorithm.

In some embodiments, obtaining feedback (Step 950) may comprise obtaining input related to information provided by Step 940. In some examples, the input may be entered through a graphical user interface, through a web site, using a keyboard and/or a mouse and/or a touch pad and/or a touch screen, using a microphone as voice input and/or voice commands, using a camera as hand gestures, and so forth. In some examples, the feedback may comprise indications from the user regarding the associations of activities and/or events and/or points in time. For example, the user may reject some associations, may correct and/or change some associations, may add associations, may modify information related to activities and/or events and/or points in time, and so forth. For example, the user may modify a point in time by entering a different time index, by selecting an image from the stream of images obtained by Step 910, and so forth. In another example, the user may modify an activity and/or event by pointing to images and/or regions within images that depict the desired activity and/or event. In another example, the user may modify an association of activities and/or events and/or points in time by removing some of the activities and/or events and/or points in time, by selecting activities and/or events and/or points in time to be added to the association from a plurality of alternative activities and/or events and/or points in time, by switching an activity and/or an event and/or a point in time with a different activity and/or event and/or point in time (for example by selecting the activity and/or event and/or point in time to be replaced and/or by selecting the new activity and/or event and/or point in time from a plurality of alternative activities and/or events and/or points in time).

In some embodiments, obtaining event detection rule (Step 960) may comprise obtaining one or more event detection rules configured to analyze images to detect one or more events, for example based on the events identified by Step 930. In some examples, Step 960 may select one or more event detection rules of a plurality of alternative event detection rules, for example based on the events identified by Step 930. For example, a data structure containing records, where each record containing an event type identifier and a set of alternative event detection rules, may be accessed according to the type of the events identified by Step 930 to select sets of alternative event detection rules. In another example, a rule for selecting event detection rules of a plurality of alternative event detection rules according to events identified by Step 930 may be used. In some examples, Step 960 may train a machine learning algorithm using a plurality of training examples to obtain the one or more event detection rules. Some examples of such machine learning algorithms may include deep learning algorithms, trainable artificial neural network, support vector machines, random forest, trainable classifiers, trainable object detectors, trainable event detectors, trainable action detectors, and so forth. In some examples, the plurality of training examples may be based on the events identified by Step 930. For example, the plurality of training examples may include at least part of the events identified by Step 930. In another example, at least some of the plurality of training examples may be selected from a plurality of alternative training examples and/or from a plurality of alternative sets of training examples based on the events identified by Step 930, for example using a selection rule.

In some embodiments, Step 960 may further base the one or more event detection rules on the feedback obtained by Step 950. For example, the feedback may include a selection of events out of the events identified by Step 930, and Step 960 may base on the event detection rules on the selected events, possibly ignoring the events that were not selected. In another example, the feedback may include an assignment of weights to events, and Step 960 may base on the event detection rules on the weights, for example by assigning weights to at least some training examples used by Step 960 (as described above) according to the feedback. In yet another example, the feedback may split the events identified by Step 930 into groups (for example by associating the events with different activities), and Step 960 may base different event detection rules on different groups of events.

Figure 10A:
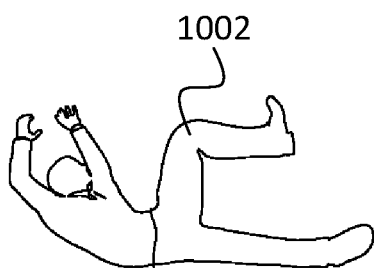
FIGS. 10A, 10B, 10C and 10D are schematic illustrations of example images captured by an apparatus consistent with an embodiment of the present disclosure.
Figure 10B:
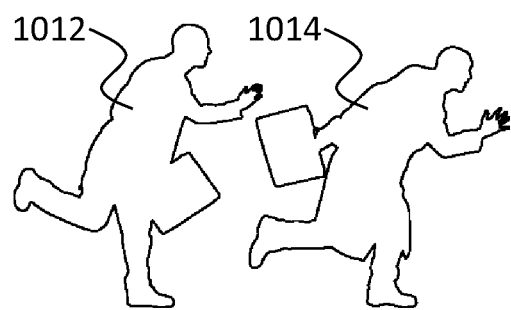
Figure 10C:
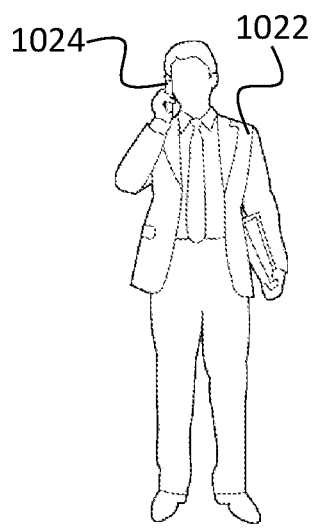
Figure 10D:
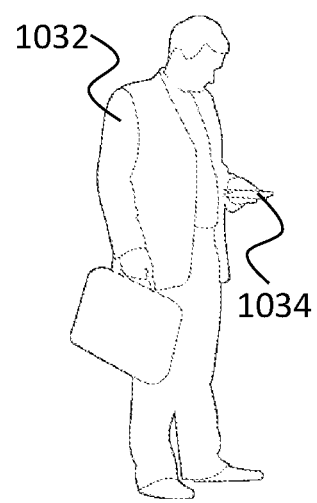

FIG. 10A is a schematic illustration of an example image 1000 captured by an apparatus, such as apparatus 200. In this example, image 1000 may comprise person 1002 being injured. FIG. 10B is a schematic illustration of an example image 1010 captured by an apparatus, such as apparatus 200. In this example, image 1010 may comprise persons 1012 and 1014 running. FIG. 10C is a schematic illustration of an example image 1020 captured by an apparatus, such as apparatus 200. In this example, image 1020 may comprise person 1022 using phone 1024. FIG. 10D is a schematic illustration of an example image 1030 captured by an apparatus, such as apparatus 200. In this example, image 1030 may comprise person 1032 using computerized device 1034 (such as a smartphone, a tablet, a personal computer, etc.). Process 900 may obtain images 1000 and/or 1010 and/or 1020 and/or 1030 using Step 910.

In some examples, person 1002 and person 1012 may be the same person, and image 1010 may precede image 1000 in time. In such case, Step 920 may identify a point in time corresponding to image 1000 and recognize that person 1002 is being injured in image 1000, Step 930 may identify that person 1002 is running in image 1010 and deduce that the running in image 1010 leads to the injury in image 1000, Step 960 may generate an event detector configured to detect when people (or selected people) are running, and the event detector may be used to analyze future images and warn when people (or the selected people) are running, for example in order to prevent further injuries.

In some examples, image 1000 may precede image 1010 in time. In such case, Step 920 may identify a point in time corresponding to image 1010 and recognize that persons 1012 and 1014 are running in image 1010, Step 930 may identify that person 1002 is being injured in an accident occurring in image 1000 and deduce that the accident in image 1000 caused the people to run in image 1010 (for example toward person 1002, to help person 1002, away from the accident, etc.), Step 960 may generate an event detector configured to detect people being injured and/or accidents, and the event detector may be used to analyze future images and detect emergency situations.

In some examples, image 1000 may precede image 1020 in time. In such case, Step 920 may identify a point in time corresponding to image 1020 and recognize that person 1022 is using phone 1024 to call an emergency center (for example, by analyzing audio and/or by receiving dialing information from phone 1024), Step 930 may identify that person 1002 is being injured in an accident occurring in image 1000 and deduce that the accident in image 1000 caused person 1022 to call the emergency center in image 1020, Step 960 may generate an event detector configured to detect people being injured and/or accidents, and the event detector may be used to analyze future images and detect emergency situations and/or to automatically contact an emergency center.

In some examples, image 1000 may precede image 1030 in time. In such case, Step 920 may identify a point in time corresponding to image 1030 and recognize that person 1032 is using computerized device 1034 to contact an emergency center (for example by receiving usage information from computerized device 1034), Step 930 may identify that person 1002 is being injured in an accident occurring in image 1000 and deduce that the accident in image 1000 caused person 1032 to contact the emergency center in image 1030, Step 960 may generate an event detector configured to detect people being injured and/or accidents, and the event detector may be used to analyze future images and detect emergency situations and/or to automatically contact an emergency center.

In some examples, images depicting person 1022 looking for food may precede image 1020 in time. In such case, Step 920 may identify a point in time corresponding to image 1020 and recognize that person 1022 is using phone 1024 to call a food delivery service or to make a reservation at a restaurant (for example, by analyzing audio and/or by receiving dialing information from phone 1024), Step 930 may identify that person 1022 looked for food in the images preceding the usage of the phone and deduce that this lead to the usage of the phone, Step 960 may generate an event detector configured to detect people looking for food, and the event detector may be used to analyze future images and detect people looking for food, for example to automatically order a delivery or suggest a restaurant.

In some examples, images depicting person 1032 looking for food may precede image 1030 in time. In such case, Step 920 may identify a point in time corresponding to image 1030 and recognize that person 1032 is using computerized device 1034 to order a delivery or to make a reservation at a restaurant (for example by receiving usage information from computerized device 1034), Step 930 may identify that person 1032 looked for food in the images preceding the usage of the computerized device and deduce that this lead to the usage of the computerized device, Step 960 may generate an event detector configured to detect people looking for food, and the event detector may be used to analyze future images and detect people looking for food, for example to automatically order a delivery or suggest a restaurant.

In some examples, image 1020 or image 1030 may precede in time images of person 1022 or person 1032 (respectively) leaving a house. In such case, Step 920 may identify a point in time corresponding to the leaving of the house, Step 930 may identify that the person leaving the house ordered a car service or reserved a place at a restaurant (for example using phone 1024 in image 1020 or using computerized device 1034 in image 1030), Step 960 may generate an event detector configured to detect people ordering a car service or reserving place at a restaurant, and the event detector may be used to analyze future images and predict when people are about to leave the house.

Figure 11:
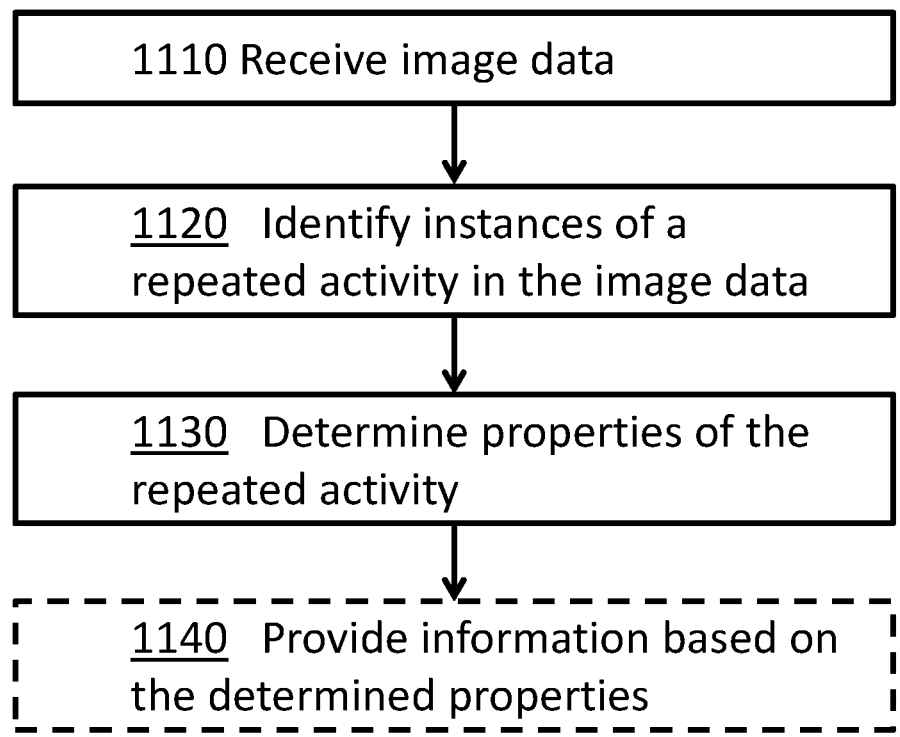
FIG. 11 illustrates an example of a process for collecting information about repeated behavior.

FIG. 11 illustrates an example of process 1100 for collecting information about repeated behavior. In some examples, process 1100, as well as all individual steps therein, may be performed by various aspects of: apparatus 200; server 300; cloud platform 400; computational node 500; and so forth. For example, process 1100 may be performed by processing units 220, executing software instructions stored within memory units 210 and/or within shared memory modules 410. In this example, process 1100 may comprise: receiving image data (Step 1110); identifying instances of a repeated activity in the image data (Step 1120); determining properties of the repeated activity (Step 1130); and providing information based on the determined properties (Step 1140). In some implementations, process 1100 may comprise one or more additional steps, while some of the steps listed above may be modified or excluded. For example, in some cases Steps 1110 and/or Step 1120 and/or Step 1140 may be excluded from process 1100. In some implementations, one or more steps illustrated in FIG. 11 may be executed in a different order and/or one or more groups of steps may be executed simultaneously and vice versa. For example, Step 1120 and/or Step 1130 may be executed after and/or simultaneously with Step 1110, Step 1130 may be executed before, after and/or simultaneously with Step 1120, Step 1140 may be executed after and/or simultaneously with Step 1130, and so forth. Examples of possible execution manners of process 1100 may include: continuous execution, returning to the beginning of the process once the process normal execution ends; periodically execution, executing the process at selected times; execution upon the detection of a trigger, where examples of such trigger may include trigger from a user, trigger from another process, trigger from an external device, etc.; any combination of the above; and so forth.

In some embodiments, receiving image data (Step 1110) may comprise obtaining a stream of images captured using one or more image sensors from an environment, for example as described above. In some embodiments, receiving image data (Step 1110) may comprise, in addition or alternatively to obtaining the stream of images, obtaining other inputs, for example as described above, for example as described above.

In some embodiments, receiving image data (Step 1110) may comprise obtaining information based on image data, for example based on a stream of images captured by an apparatus, such as apparatus 200. For example, a stream of images may be captured and analyzed by another process and/or an external device, and Step 1110 may receive data containing results of the analysis. Such results may include information related to items detected in the image data. For example, an item may include an object or a person, and the information may comprise a type of an object, identity of an item, location of an item, times at which an item appears, time an item first or last appears in the image data, other properties of an item, and so forth. In another example, an item may include events, activities, behaviors, and so forth, and the information may comprise properties of the item, information related to the item, type of item, time the item occurred, identities of people involved, objected used, locations, and so forth.

In some embodiments, identifying instances of a repeated activity in the image data (Step 1120) may comprise analyzing information received by Step 1110 to identify instances of a repeated activity and/or behavior. In some examples, the information may be analyzed to identify instances of a repeated activity and/or behavior of a selected person or of a selected group of people. In some examples, Step 1120 may be repeated to identify instances of a repeated activity and/or behavior of different persons or different groups of people. In some examples, the information may be analyzed to identify instances of a repeated activity and/or behavior (possibly of a selected person or a selected group of people) that repeat at least a select minimal number of times (such as two times, three times, five times, ten times, one hundred times, and so forth).

In some embodiments, information received by Step 1110 may comprise image data, and Step 1120 may analyze the image data to identify activities and/or behaviors in the image data. In some examples, machine learning and/or deep learning algorithms trained to detect activities and/or behaviors in images, possibly together with properties of the activities and/or behaviors, may be used. For example, the machine learning and/or deep learning algorithms may be trained using training images, and the training images may be labeled according to which activities and/or behaviors appearing in the images, and/or according to properties of the activities and/or behaviors appearing in the images. In another example, face recognition algorithms may be used to determine which person or group of people are involved in an activity and/or behavior. In yet another example, object detection algorithms may be used to identify which objects are used or involved in the activity. In another example, the location of the activity and/or behavior may be determined based on the location the activity and/or behavior appears in the image data, possibly together with information related to the field of view of the image sensor used to capture the image data. In yet another example, the time of the activity and/or behavior may be determined based on the time the activity and/or behavior appears in the image data.

In some embodiments, information received by Step 1110 or the information obtained by analyzing the image data received by Step 1110 may comprise information about activities and/or behaviors appearing in image data, together with identifying information of people involved in the activities and/or behaviors. In such cases, Step 1120 may analyze the information to identify activities and/or behaviors performed by or involving a selected individual or a group of selected individuals, and determine which of the identified activities and/or behaviors of the selected individual or a group of selected individuals repeat. In such cases, Step 1120 may analyze the information to identify which activities and/or behaviors repeat, determine which activity and/or behavior performed by which person (for example by accessing this property in the data received by Step 1110 or the result of the analysis of the image data received by Step 1110), and out of the identified activities and/or behaviors select activities and/or behaviors repeated by a selected person or a selected group of people.

In some embodiments, Step 1120 may count the number of repetitions of the activity and/or behavior by the selected person or selected group of people, and in some cases some of the activities and/or behaviors may be ignored based on the number of repetitions (for example when the number of repetitions is below a selected threshold, is above a selected threshold, is not within a selected range, and so forth). In some examples, the information received by Step 1110 or obtained by analyzing the images obtained by Step 1110 may comprise properties of occurrences of the activity and/or behavior, and Step 1120 may count repetitions with selected properties, for example repetitions within selected time frames, at selected locations, and so forth. In some examples, the information received by Step 1110 or obtained by analyzing the images obtained by Step 1110 may comprise properties of the occurrences of activities and/or behaviors, and Step 1120 may ignore occurrences of activities and/or behaviors with selected properties, for example Step 1120 may ignore occurrences of the activity and/or behavior that are within or outside some selected time frames, that are within or outside a selected area, that involve selected objects, that occur for less than a selected minimal time duration, and so forth.

In some embodiments, determining properties of the repeated activity (Step 1130) may comprise determining properties of the repeated activity and/or behavior identified in Step 1120, for example based on the instances of the repeated activity and/or behavior identified in Step 1120 and/or based on properties of the instances of the repeated activity and/or behavior identified in Step 1120 and/or based on the image data received in Step 1110. Step 1130 may be repeated for different repeated activities and/or behaviors identified by Step 1120, for the same repeated activity and/or behavior of different people or different groups of people, and so forth. The different results obtained from the multiple repetitions of Step 1130 may be compared.

In some examples, Step 1130 may analyze the occurrence time of the instances of the repeated activity and/or behavior, or the number of instances of the repeated activity and/or behavior identified within a selected time frame, to determine a frequency of the repeated activity and/or behavior. For example, Step 1130 may determine a typical or average frequency of the repeated activity and/or behavior for different time frames, for different parts of the day, for different days of the week or month, for different months, for different seasons of the year, for different years, and so forth. In another example, Step 1130 may determine typical times when the repeated activity and/or behavior usually take place, typical times when the repeated activity and/or behavior usually take place at a selected location and/or area, and so forth.

In some examples, Step 1130 may analyze the locations that Step 1120 determined for the instances of the repeated activity and/or behavior, or the information received by Step 1110 may be accessed to determine locations for the instances of the repeated activity and/or behavior, to determine information related to locations and areas related to the repeated activity and/or behavior. For example, Step 1130 may determine typical location or area where the repeated activity and/or behavior usually take place, typical location or area where the repeated activity and/or behavior usually take place at selected time frames, and so forth.

In some examples, Step 1130 may analyze properties of the instances of the repeated activity and/or behavior, whether determined by Step 1120 or obtained by analyzing the information received by Step 1110, to determine typical and/or aggregated and/or statistical information related to the repeated activity and/or behavior. For example, such properties may include type of objects used in the instances of the repeated activity and/or behavior, and the determined information may include a list of typical objects used, number of objects used, number of times selected objects were used, percentage of the instances of the repeated activity and/or behavior where selected objects were used, and so forth. In another example, the repeated activity and/or behavior may involve interaction with other people, and the properties may include identifying information about people that were interacted with, and the information may include a list of people that were interacted with, number of people that were interacted with, percentage of the instances of the repeated activity and/or behavior where a selected person or selected group of people were interacted with, and so forth.

In some embodiments, providing information based on the determined properties (Step 1140) may comprise providing information related to repeated activities and/or behaviors identified by Step 1120 (for example information determined by Step 1130), to a user, to another process, to an external device, and so forth. In some examples, Step 1140 may provide the information visually, for example using a graphical user interface, using a web site, using a display system, using an augmented reality system, using a virtual reality system, in a printed form, and so forth. For example, Step 1140 may visually present images of the repeated activities and/or behaviors (for example, parts of images received by Step 1110 that depicts the repeated activities and/or behaviors). In another example, Step 1140 may visually present textual information describing the repeated activities and/or behaviors identified by Step 1120 and/or properties of the repeated activities and/or behaviors determined by Step 1130. In yet another example, Step 1140 may present a graph comparing properties of repeated activities and/or behaviors determined by Step 1130. In some examples, Step 1140 may provide the information audibly, for example through audio speakers, using head set, and so forth. For example, textual information describing the repeated activities and/or behaviors identified by Step 1120 and/or properties of the repeated activities and/or behaviors determined by Step 1130 may be read aloud, for example by taking the textual information and converting it to audible output using text to speech algorithms.

In some embodiments, Step 1120 and/or Step 1130 may be repeated to identify different repeated activities and/or behaviors of the same person or of different people, or to identify the same repeated activity and/or behavior of different people. Process 1100 may receive (from a user, from another process, from external device, etc.) a request to provide information related to a selected person and/or a selected activity, and Step 1140 may provide the requested information. For example, a first request for information related to a first person may be received, and in response to the first request Step 1140 may provide information related to properties of a repeated activity of the first person, and a second request for information related to a second person may be received, and in response Step 1140 may provide information related to properties of a repeated activity of the second person. In another example, a first request for information related to a first activity and/or behavior may be received, and in response to the first request Step 1140 may provide information related to properties of the first activity and/or behavior, and a second request for information related to a second activity and/or behavior may be received, and in response Step 1140 may provide information related to properties of the second activity and/or behavior. In yet another example, a first request for information related to a first person and a first activity and/or behavior may be received, and in response to the first request Step 1140 may provide information related to properties of the first activity and/or behavior of the first person, and a second request for information related to a second person and a second activity and/or behavior may be received, and in response Step 1140 may provide information related to properties of the second activity and/or behavior of the second person.

Figure 12A:
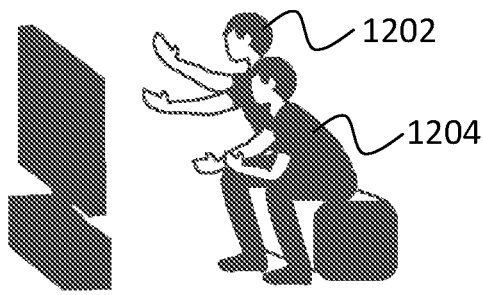
FIGS. 12A, 12B, 12C, 12D, 12E and 12F are schematic illustrations of example images captured by an apparatus consistent with an embodiment of the present disclosure.
Figure 12B:
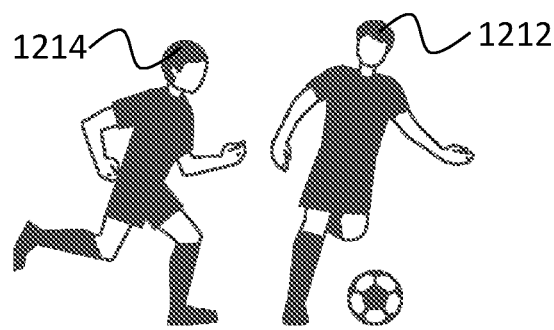
Figure 12C:
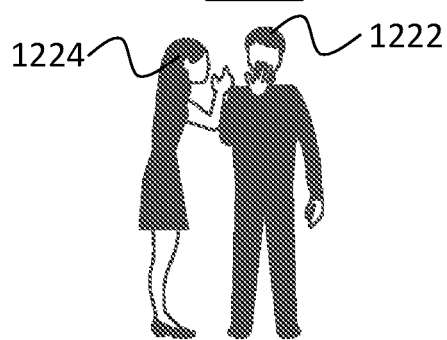
Figure 12D:
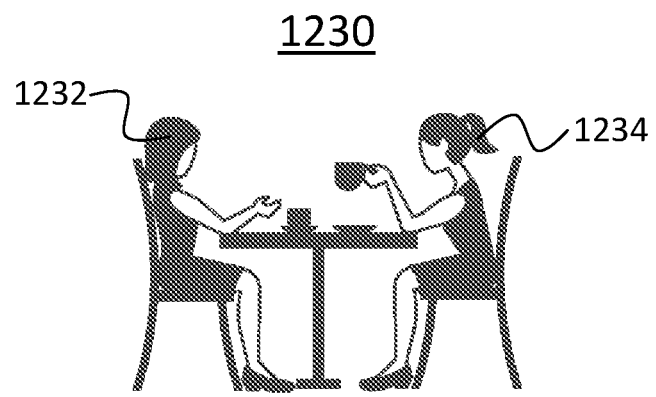
Figure 12E:
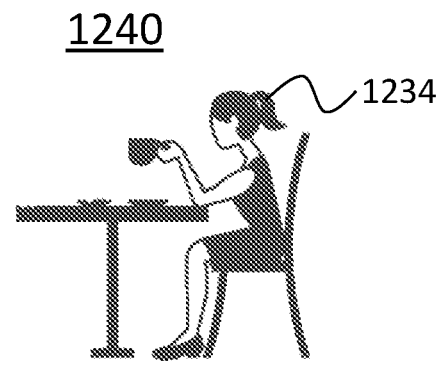
Figure 12F:
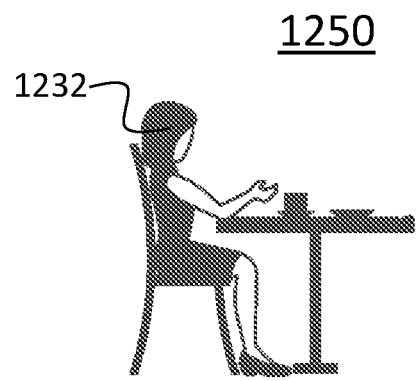

FIG. 12A is a schematic illustration of an example image 1200 captured by an apparatus, such as apparatus 200. In this example, image 1200 may comprise person 1202 and person 1204 watching television. FIG. 12B is a schematic illustration of an example image 1210 captured by an apparatus, such as apparatus 200. In this example, image 1210 may comprise person 1212 and person 1214 engaging in a physical activity, in this case playing soccer. FIG. 12C is a schematic illustration of an example image 1220 captured by an apparatus, such as apparatus 200. In this example, image 1220 may comprise person 1222 and person 1224 interacting with each other, in this case in a conversation. FIG. 12D is a schematic illustration of an example image 1230 captured by an apparatus, such as apparatus 200. In this example, image 1230 may comprise person 1232 and person 1234 sitting next to a table and eating. FIG. 12E is a schematic illustration of an example image 1240 captured by an apparatus, such as apparatus 200. In this example, image 1240 may comprise person 1234 sitting next to a table and eating. FIG. 12F is a schematic illustration of an example image 1250 captured by an apparatus, such as apparatus 200. In this example, image 1250 may comprise person 1232 sitting next to a table and eating. Process 1100 may obtain images 1200 and/or 1210 and/or 1220 and/or 1230 and/or 1240 and/or 1250 using Step 1110.

In some examples, Step 1120 may analyze image 1200 to identify that person 1202 and person 1204 are watching television, and may further identify properties of this activity, such as the time the activity begins and/or ends, the duration of the activity, the identity of the people watching the television, the identity of people present in the room that do not watch the television, the content watched in the television (for example by analyzing images of the television screen and comparing it with a database of known contents to identify the content, by analyzing audio and comparing it with a database of known contents to identify the content, by receiving content identifier from the television and/or from a device paired with the television, etc.), the sitting arrangement, the food consumed while watching the television, and so forth. Other images obtained by Step 1110 of people watching the television may be analyzed in a similar manner, including images were the people watching the television include person 1202 and images were the people watching the television do not include person 1202. Step 1130 may aggregate information about all or some of the occurrences were person 1202 watched the television. For example, Step 1130 may generate aggregated information and/or statistics about the watching habits of person 1202, such as the watching hours, the watching durations, watching mates, watched content, sitting place, food consumed during watching (for example, the average calories per day consumed while watching television), and so forth. The information generated by Step 1130 may be provided using Step 1140.

In some examples, Step 1120 may analyze image 1210 to identify that person 1212 and person 1214 are engaged in a physical activity, and may further identify properties of the physical activity, such as the time the activity begins and/or ends, the duration of the activity, the identity of the people engaged in the physical activity, the identity of people present in the environment that are not part of the physical activity, the type of the physical activity (playing soccer in the example of image 1210), the location the physical activity takes place at, and so forth. Other images obtained by Step 1110 of people engaged in physical activity may be analyzed in a similar manner, including images were the people engaged in the physical activity includes person 1212 and images were the people engaged in the physical activity do not include person 1212. Step 1130 may aggregate information about all or some of the occurrences were person 1212 was engaged in physical activity. For example, Step 1130 may generate aggregated information and/or statistics about the exercising customs of person 1212, such as exercising hours, physical activities durations, exercising partners, exercising locations, tools used for exercising, type of physical activities, and so forth. The information generated by Step 1130 may be provided using Step 1140.

In some examples, Step 1120 may analyze image 1220 to identify that person 1222 and person 1224 are interacting with each other (in this example in a conversation), and may further identify properties of the interaction, such as the time the interaction begins and/or ends, the duration of the interaction, the identity of the people involved in the interaction, the identity of people present in the room that are not involved in the interaction, the type of the interaction (such as conversation, hand shake, etc.), the content of a conversation (for example by analyzing audio captured from the environment using speech to text algorithms and/or natural language processing algorithms), the location of the interaction, and so forth. Other images obtained by Step 1110 of people interacting with each other may be analyzed in a similar manner, including images were the interacting people include person 1222 and images were the interacting people do not include person 1222. Step 1130 may aggregate information about all or some of the interactions involving person 1222. For example, Step 1130 may generate aggregated information and/or statistics about the interactions of person 1222, such as the times of the interactions, the durations of the interactions, the partners to the interactions, the content of the conversations, the locations of the interactions, and so forth.

In some examples, Step 1120 may analyze image 1230 to identify that person 1232 and person 1234 are eating, and may further identify properties of the meal, such as the starting and/or ending time of the meal, the duration of the meal, the identity of the people eating, the identity of people present that do not eat, the food consumed by a person and/or properties of the food consumed (such as the calories of the food, nutrition value of the food, the ingredients of the food, etc.), the sitting arrangement, and so forth. Other images obtained by Step 1110 of people eating may be analyzed in a similar manner. For example, Step 1120 may analyze image 1240 to identify that person 1234 is eating while person 1232 is not present, and may analyze image 1250 to identify that person 1232 is eating while person 1234 is not present. Step 1130 may aggregate information about all or some of the occurrences were person 1232 is eating. In such case, information from images 1230 and 1250 may be taken into account and information from image 1240 may be ignored, while when Step 1130 aggregates information about all or some of the occurrences were person 1234 is eating, information from images 1230 and 1240 may be taken into account and information from image 1250 may be ignored. For example, Step 1130 may generate aggregated information and/or statistics about the eating habits of person 1232, such as meals time, meals duration, food consumed (or properties of the consumed food, such as calories, nutrition values, ingredients, etc.), sitting place, and so forth. The information generated by Step 1130 may be provided using Step 1140.

In some examples, Step 1120 may analyze image 1030 to identify that person 1032 is using computerized device 1034, and may further identify properties of this activity, such as the time the activity begins and/or ends, the duration of the activity, the type and/or identity of computerized device 1034, usage data of computerized device 1034 (for example by analyzing image of the computerized device 1034 screen and comparing it with a database of known applications, by receiving usage information from computerized device 1034, etc.), the location of the activity, and so forth. Other images obtained by Step 1110 of people (whether person 1032 or other persons) using computerized devices (whether computerized device 1034 or other computerized devices) may be analyzed in a similar manner. Step 1130 may aggregate information about all or some of the occurrences were person 1032 used computerized device 1034 or of all or some of the occurrences were person 1032 used any computerized device. For example, Step 1130 may generate aggregated information and/or statistics about the computerized device usage habits of person 1032 or about usage habits of computerized device 1034 of person 1032, such as the usage hours, the usage durations, the used content, the usage locations, the used devices, and so forth. The information generated by Step 1130 may be provided using Step 1140.

It will also be understood that the system according to the invention may be a suitably programmed computer, the computer including at least a processing unit and a memory unit. For example, the computer program can be loaded onto the memory unit and can be executed by the processing unit. Likewise, the invention contemplates a computer program being readable by a computer for executing the method of the invention. The invention further contemplates a machine-readable memory tangibly embodying a program of instructions executable by the machine for executing the method of the invention. Moreover, consistent with other disclosed embodiments, non-transitory computer readable storage media may store program instructions, which may be executed by at least one processor and perform any of the methods described herein.

What is claimed is:

1. A system for image processing, the system comprising:
at least one processing unit configured to:
    obtain a first group of one or more images captured using at least one image sensor from an environment;
    analyze the first group of one or more images to identify at least one object in the environment;
    obtain a second group of one or more images captured using the at least one image sensor from the environment;
    identify at least a first region and a second region of the second group of one or more images based on the identified at least one object, wherein the first region differs from the second region;
    select a processing scheme of a plurality of alternative processing schemes based on the identified at least one object;
    process the first region using the selected processing scheme; and
    process the second region using a second processing scheme, wherein the second processing scheme differs from the first processing scheme.

2. The system of claim 1, wherein the system includes the at least one image sensor.

3. The system of claim 1, wherein the second group of one or more images is captured after the identification of the at least one object.

4. The system of claim 1, wherein at least one of identifying the at least one object and identifying the first region and the second region is based on user input.

5. The system of claim 1, wherein identifying the at least one object is based on motion patterns in the first group of one or more images.

6. The system of claim 1, wherein the first region corresponds to a region in the first group of one or more images depicting at least part of the at least one object.

7. The system of claim 1, wherein the at least one object comprises at least one of a blinking light source and a display monitor.

8. The system of claim 1, wherein the at least one object comprises at least one of a window and a mirror.

9. The system of claim 1, wherein the at least one object comprises at least one of a fan and a tree.

10. A method for image processing, the method comprising:
    obtaining a first group of one or more images captured using at least one image sensor from an environment;
    analyzing the first group of one or more images to identify at least one object in the environment;
    obtaining a second group of one or more images captured using the at least one image sensor from the environment;
    identifying at least a first region and a second region of the second group of one or more images based on the identified at least one object, wherein the first region differs from the second region;
    selecting a processing scheme of a plurality of alternative processing schemes based on the identified at least one object;
    processing the first region using the selected processing scheme; and
    processing the second region using a second processing scheme, wherein the second processing scheme differs from the first processing scheme.

11. The method of claim 10, wherein the second group of one or more images is captured after the identification of the at least one object.

12. The method of claim 10, wherein at least one of identifying the at least one object and identifying the first region and the second region is based on user input.

13. The method of claim 10, wherein identifying the at least one object is based on motion patterns in the first group of one or more images.

14. The method of claim 10, wherein the first region corresponds to a region in the first group of one or more images depicting at least part of the at least one object.

15. The method of claim 10, wherein the at least one object comprises a display monitor.

16. The method of claim 10, wherein the at least one object comprises a blinking light source.

17. The method of claim 10, wherein the at least one object comprises at least one of a window and a mirror.

18. The method of claim 10, wherein the at least one object comprises a fan.

19. The method of claim 10, wherein the at least one object comprises a tree.

20. A non-transitory computer readable medium storing data and computer implementable instructions for carrying out a method, the method comprising:
    obtaining a first group of one or more images captured using at least one image sensor from an environment;
    analyzing the first group of one or more images to identify at least one object in the environment;

obtaining a second group of one or more images captured using the at least one image sensor from the environment;

identifying at least a first region and a second region of the second group of one or more images based on the identified at least one object, wherein the first region differs from the second region;

selecting a processing scheme of a plurality of alternative processing schemes based on the identified at least one object;

processing the first region using the selected processing scheme; and processing the second region using a second processing scheme, wherein the second processing scheme differs from the first processing scheme.

* * * * *